US012496560B2

(12) United States Patent
Navon et al.

(10) Patent No.: US 12,496,560 B2
(45) Date of Patent: Dec. 16, 2025

(54) ON-THE-GO CARBONATION

(71) Applicant: SIF BUBBLES INC., New Castle County, DE (US)

(72) Inventors: Ron Navon, Qiryat-ono (IL); Erez Haim, Pembroke Pines, FL (US); Carlos Kanterewicz, Zur Moshe (IL); Rafi Muller Leigh, North Vancouver (CA)

(73) Assignee: SIF BUBBLES INC., Wilmington, DE (US)

( * ) Notice: Subject to any disclaimer, the term of this patent is extended or adjusted under 35 U.S.C. 154(b) by 0 days.

(21) Appl. No.: 19/090,437

(22) Filed: Mar. 26, 2025

(65) Prior Publication Data

US 2025/0303369 A1 Oct. 2, 2025

Related U.S. Application Data

(60) Provisional application No. 63/570,819, filed on Mar. 28, 2024.

(51) Int. Cl.

| | |
|---|---|
| ***B01F 23/23*** | (2022.01) |
| ***B01F 23/236*** | (2022.01) |
| ***B01F 23/2361*** | (2022.01) |
| ***B01F 35/71*** | (2022.01) |

(52) U.S. Cl.

CPC .... *B01F 23/23611* (2022.01); *B01F 23/2363* (2022.01); *B01F 35/7131* (2022.01)

(58) Field of Classification Search

CPC ............ B01F 23/23611; B01F 23/2353; B01F 35/7131

See application file for complete search history.

(56) References Cited

U.S. PATENT DOCUMENTS

| | | | | |
|---|---|---|---|---|
| 2,073,273 A * | 3/1937 | Korn | B01F 23/23611 | 426/477 |
| 2,172,035 A * | 9/1939 | Roth | B01F 23/23611 | 261/DIG. 7 |
| 2,220,146 A * | 11/1940 | Curry | B67D 1/0418 | 222/394 |
| 2,805,846 A * | 9/1957 | Dewan | B01F 23/23611 | 261/DIG. 7 |

(Continued)

*Primary Examiner* — Vishal Pancholi

(74) *Attorney, Agent, or Firm* — PEARL COHEN ZEDEK LATZER BARATZ LLP

(57) ABSTRACT

On-the-go carbonation devices and methods are provided, which enable carbonating and enhancing liquid content in various containers, such as drinking bottles, in relation to users' preferences and activity patterns. Devices include a sealed enclosure holding a gas canister, an actuator configured to release gas from the gas canister and break a seal of the sealed enclosure, and a gas passage configured to deliver the released gas, optionally with flavoring and/or supplement additives—into the liquid. Various configurations of the devices are provided to yield predefined carbonation and mixing of additives by simple actuation. Disclosed methods of carbonation enable configuring the device to be portable and attachable to various types of liquid container. Various types of additives may be used, provided in preparation kits and monitored by an application that supports healthy consumption and enhancements of liquids.

17 Claims, 18 Drawing Sheets

(56) References Cited

U.S. PATENT DOCUMENTS

| | | | | | |
|---|---|---|---|---|---|
| 4,526,730 | A * | 7/1985 | Cochran | B01F 23/23611 | 426/477 |
| 4,679,602 | A * | 7/1987 | Hollis | B65B 31/04 | 261/DIG. 7 |
| 4,867,209 | A * | 9/1989 | Santoiemmo | B01F 23/23611 | 261/DIG. 7 |
| 5,329,975 | A * | 7/1994 | Heitel | B65D 83/42 | 261/DIG. 7 |
| 5,980,959 | A * | 11/1999 | Frutin | B67D 1/0406 | 426/118 |
| 6,098,795 | A * | 8/2000 | Mollstam | C12N 1/20 | 206/219 |
| 8,522,968 | B2 * | 9/2013 | Middleman | A47G 21/00 | 206/568 |
| 2006/0118435 | A1 * | 6/2006 | Cronin | B65D 47/243 | 206/219 |
| 2011/0113972 | A1 * | 5/2011 | Tatera | B01F 35/7547 | 99/323.1 |
| 2011/0115103 | A1 * | 5/2011 | Tatera | B01F 35/712 | 261/DIG. 7 |
| 2013/0113124 | A1 * | 5/2013 | Hoffmann | B67D 1/0418 | 261/DIG. 7 |
| 2014/0272052 | A1 * | 9/2014 | Bueno | A23L 2/54 | 426/477 |
| 2023/0302418 | A1 | 9/2023 | Gröning | | |
| 2023/0309739 | A1 | 10/2023 | Perrelli et al. | | |

* cited by examiner 100 (part)

250

ON-THE-GO CARBONATION

CROSS REFERENCE TO RELATED APPLICATIONS

This application claims the benefit of U.S. Provisional Patent Application No. 63/570,819, filed on Mar. 28, 2024, which is incorporated herein by reference in its entirety.

BACKGROUND OF THE INVENTION

1. Technical Field

The present invention relates to the field of beverage production and consumption, and more particularly, to on-the-go carbonation devices.

2. Discussion of Related Art

Various tabletop carbonation devices are available in the market. Commonly, flavoring extracts can be mixed into the carbonated drink before or after carbonation to provide a range of flavored carbonated drinks.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides an on-the-go carbonation device that is sealably attachable to a bottle and enables carbonating a liquid held in the bottle, the device comprising: a sealed enclosure holding a gas canister, an actuator configured to release gas from the gas canister and break a seal of the sealed enclosure, and a gas passage configured to deliver the released gas into the liquid.

One aspect of the present invention provides a kit comprising a plurality of gas canisters and optionally additive containers for refilling and reusing the on-the-go carbonation device.

One aspect of the present invention provides a method of providing on-the-go carbonation, the method comprising configuring an on-the-go carbonation device to be sealably attachable to a bottle and enable carbonating a liquid held in the bottle, and carrying out the carbonation by releasing gas from a gas canister enclosed in a sealed enclosure of the device, breaking a seal of the sealed enclosure, and forming a gas passage configured to deliver the released gas into the liquid One aspect of the present invention provides a computer program product comprising a non-transitory computer readable storage medium having computer readable program embodied therewith, the computer readable program comprising computer readable program configured to monitor use of an on-the-go carbonation device with respect to usage of gas canisters and additives, and computer readable program configured to provide users with suggestions for further use of the on-the-go carbonation device, in relation to the monitored use.

These, additional, and/or other aspects and/or advantages of the present invention are set forth in the detailed description which follows, possibly inferable from the detailed description, and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout. In the accompanying drawings.

Figure 1A:
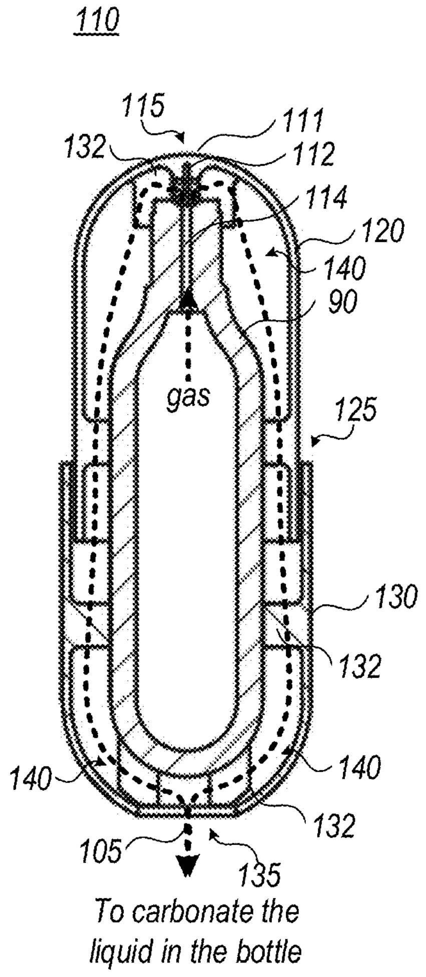
FIGS. 1A and 1B are high-level schematic illustrations of a sealed enclosure of an on-the-go carbonation device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Some embodiments of the present invention provide efficient and economical methods and mechanisms for on-the-go carbonation and thereby provide improvements to the technological field of beverage production and consumption. On-the-go carbonation devices and methods are provided, which enable carbonating and enhancing liquid content in various containers, such as drinking bottles, in relation to users' preferences and activity patterns. Devices include a sealed enclosure holding a gas canister, an actuator configured to release gas from the gas canister and break a seal of the sealed enclosure, and a gas passage configured to deliver the released gas, optionally with flavoring and/or supplement additives—into the liquid. Various configurations of the devices are provided to yield predefined carbonation and mixing of additives by simple actuation. Disclosed methods of carbonation enable configuring the device to be portable and attachable to various types of liquid container. Various types of additives may be used, provided in preparation kits and monitored by an application that supports healthy consumption and enhancements of liquids.

In various embodiments, disclosed devices and system include capsule-based smart hydration system utilizing controlled pressure infusion technology to instantly create RTD (ready-to-drink) beverages—including functional, benefit-driven, or soft drinks—by automatically infusing water with various additives such as flavors, supplements, minerals, and carbonation, requiring no shaking or stirring, specifically engineered for on-the-go consumption.

Figure 1B:
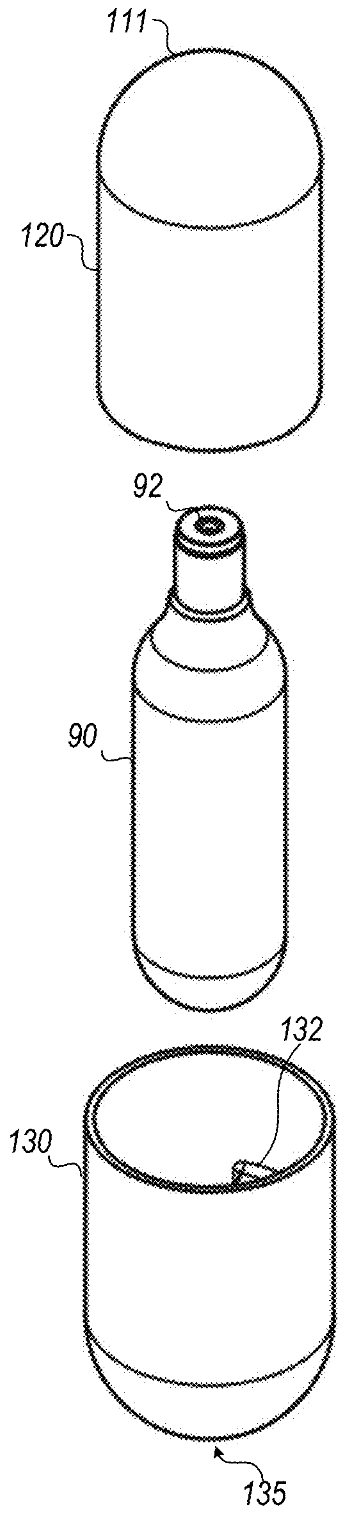

FIGS. 1A and 1B are high-level schematic illustrations of a sealed enclosure 110 of an on-the-go carbonation device 100, according to some embodiments of the invention. FIG. 1A is a cross-section view of sealed enclosure 110 holding a gas canister 90 and FIG. 1B is an exploded view of sealed enclosure 110 holding gas canister 90. In some embodiments, sealed enclosure 110 may comprise a top cover 120 sealably and moveably attached (indicated schematically by numeral 125) to a bottom cover 130. Bottom cover 130 and top cover 120 may comprise supports 132 for holding and affixing gas canister 90 in a predefined position within sealed enclosure 110. For example, sealed enclosure 110 may comprise top cover 120 and bottom cover 130 configured as a shell having two parts, one accommodating the other (one having a somewhat larger diameter at the contact region 125 than the other), and configured to allow relative movement between the parts. For example, as illustrated in FIG. 1A in a non-limiting manner, bottom cover 130 may be slightly wider than top cover 120 at attachment region 125, sealing enclosure 110 yet allowing a downward movement or sliding of top cover 120 and bottom cover 130 to allow pin 112 attached to top cover 120 to puncture gas canister 90 held within sealed enclosure 110.

Sealed enclosure 110 (also termed capsule or pod) may comprise an actuator 115 (e.g., a hollow pin 112 attached to a flexible top 111 of top cover 120, or any puncturing element) configured to release gas from gas canister 90 (indicated schematically, e.g., through a valve 92) and break the seal of sealed enclosure 110 to release the gas (or other fluid captured within canister/cylinder 90). It is noted that gas (e.g., carbon dioxide, nitrogen, or other gases) may be held in gas canister 90 in pressurized or fluidized form, and upon release may initially form a liquid which then expands to form a gas. For simplicity, the fluid contained and released from canister 90 is referred to herein in a non-limiting sense as gas.

A seal 135 at the bottom of bottom cover 130 may be configured to rupture due to the gas pressure applied by the released gas to form a gas passage 105 (indicated schematically) configured to deliver the released gas into the liquid in the bottle, to carbonate the liquid (illustrated schematically in the following figures).

In various configurations, (i) top cover 120 may be sealably and moveably attached (125) to bottom cover 130, with the relative movement of top cover 120 and bottom cover 130 operable as actuator 115 to breach gas canister 90; or (ii) top cover 120 and bottom cover 130 may form a single rigid sealed enclosure 110, with a flexible top 111 operable as actuator 115 to breach gas canister 90.

Gas passage 105 is indicated schematically by the broken arrows, as beginning 114 at the breached opening or valve 92 of gas canister 90, going through a space between the inner walls of sealed enclosure 110 and gas canister 90 and exiting sealed enclosure 110, e.g., at breached seal 135 at the bottom of bottom cover 130, and from there on continuing into the liquid in the bottle, to carbonate the liquid (illustrated schematically in the following figures). In various embodiments, sealed enclosure 110 may comprise predetermined breaking point 135 (e.g., seal 135 in bottom cover 130) configured to burst upon the releasing of the gas and open gas passage 105 into the liquid.

It is noted that actuator 115 may be configured to form gas passage 105 extending from gas canister 90 to the liquid in the bottle by (i) releasing the gas into the internal volume of sealed enclosure 110 (e.g., by moving pin 112 to open valve 92) and (ii) breaching the seal of sealed enclosure 110, e.g., through the released gas breaching a predetermined breaking point 135, e.g., seal 135, positioned e.g., at the bottom of sealed enclosure 110 and enabling the movement of the gas further into the liquid in the bottle, to carbonate the liquid (illustrated schematically in the following figures).

It is further noted that the term "bottle" as used herein refers to any type of drinkable liquid container, such as bottles, glasses, specialized tumblers such as Stanley™ cups or any other type of liquid container for cold or hot drinks. As disclosed herein, on-the-go carbonation device 100 may be configured to be sealably attached to various types of liquid containers to carbonate the liquid therein. Correspondingly, various types of carbonated drinks may be prepared by disclosed embodiments, including cold or hot drinks of various types, e.g., flavored or supplemented drinks, carbonated (sprinkling) drinks, pre- and post-workout energy drinks, dietary supplement drinks, etc.

In some embodiments, sealed enclosure 110 may further hold at least one additive 140 (indicated schematically as contained in bottom cover 130 of sealed enclosure 110, with numeral 140 denoting both the spaces, or chambers for holding additive(s) and the additives themselves). Additive(s) 140 such as flavoring agent(s), coloring agent(s) and/or nutritional supplement(s) may be held within sealed enclosure 110, e.g., in liquid form, and be swept into the liquid in the bottle by the passage of gas through gas passage 105 once the gas is released from gas canister 90 by actuator 115. Non-limiting examples for additives 140 include various flavoring and/or coloring extracts, e.g., imitating various types of drinks, teas, herbal infusions, coffees, etc. and various supplements, e.g., vitamins, minerals, enhancing substrates such as caffeine and melatonin, and so forth. Consequentially, additive(s) 140 delivered into the liquid in the bottle by the delivered released gas which carbonates the liquid in the bottle. Advantageously, the simultaneous delivery of carbonating gas and additives yields through mixing, simple application and a distinctive visual effect—all of which are lacking from current carbonation devices.

In some embodiments, sealed enclosure 110 may comprise a modular capsule having an outer shell made of two parts (e.g., top cover 120 and bottom cover 130) which house a pressurized fluid cylinder such as gas canister 90 and one or more flavoring or supplement holding chambers (see, e.g., container 142 in FIGS. 6-9B) for holding additive(s) 140 within sealed enclosure 110 and in the way of the released gas. The supplement holding chambers may be defined by supports 132 for holding and affixing gas canister 90 in a predefined position within sealed enclosure 110 and/or for holding and centering the top part of the pressurized fluid cylinder (e.g., gas canister 90), and the free space, or cavity, between the inner walls of sealed enclosure 110 and the outer wall of gas canister 90. For example, sealed enclosure 110 may comprise internal top, middle and/or bottom supports 132 for holding and centering the relevant parts of the pressurized fluid cylinder (e.g., gas canister 90). The bottom supports may be shaped to receive applied top to bottom pressure by the pressurized fluid cylinder (e.g., gas canister 90), applied upon puncturing thereof—to cause puncturing or rupturing of seal 135 at the bottom of bottom cover 130.

In various embodiments, hollow pin 112 or any other corresponding puncturing element may be hollow (e.g., needle-like), having a bottom fluid entry and one or more top fluid exit points—configured to divert and control the released pressurized gas (or other fluids). For example, hollow puncturing element 112 may be configured to form a sealed or substantially-sealed puncture opening in a seal of canister/cylinder 90 and receive the gas/fluids through the entry point in hollow puncturing element 112 and divert the gas/fluids by using two or more exit points in hollow puncturing element 112 which are adapted to point downward toward the flavoring or supplement holding chambers 140.

Seal 135 at the bottom of bottom cover 130 may be configured to prevent spillage of additive(s) from chambers 140 out sealed enclosure 110, and/or additive chambers 140 may have individual seals that are configured to rupture or otherwise release additive(s) 140 upon the release of gas from gas canister 90.

In some embodiments, sealed enclosure 110 may be configured to be reusable, by detaching top cover 120 and bottom cover 130 and removing and replacing used gas canister 90 with a new gas canister 90. Possibly, additive(s) 140 may be refilled into holding chambers 140. The preparation of sealed enclosure 110 for reuse may be carried out by the manufacturer(s), service provider(s) and/or user(s) themselves, possibly using elements from a kit comprising gas canisters 90 and additive(s) container(s) for refilling and/or replacing additive holding chambers 140 (of one or several types). In various embodiments, sealed enclosure 110 may comprise modular capsules, with replaceable gas canisters 90 (possibly corresponding to different levels of carbonation) and modularly assembled profiles of additive(s) 140 (e.g., combinations of flavoring agent(s), coloring agent(s) and/or nutritional supplement(s)). In some embodiments, additive holding chambers 140 may have different shapes, intended to receive different types of additive(s) 140. For example, a user may wish to use two chambers 140 sequentially, one with pre-workout supplements and the other with caffeine for enhancing a workout. Other users may prefer different flavors, different composition of nutritional supplement(s), etc.

Figure 2A:
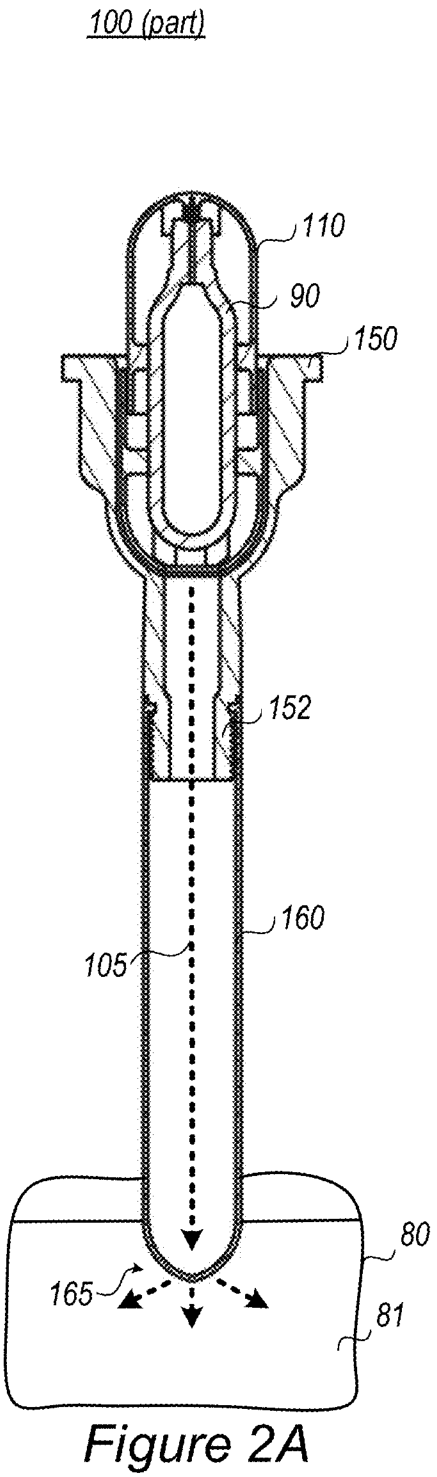
FIGS. 2A-2D are high-level schematic illustrations of a part of an on-the-go carbonation device, according to some embodiments of the invention.
Figure 2B:
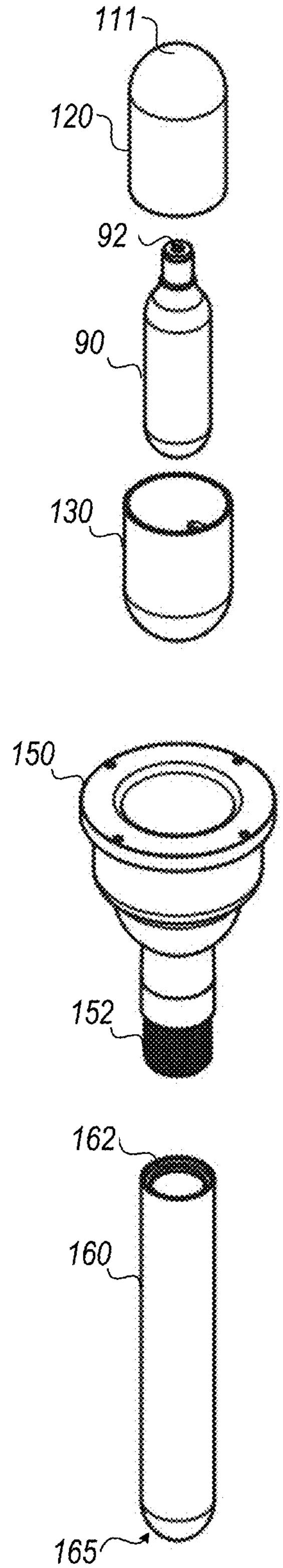
Figure 2C:
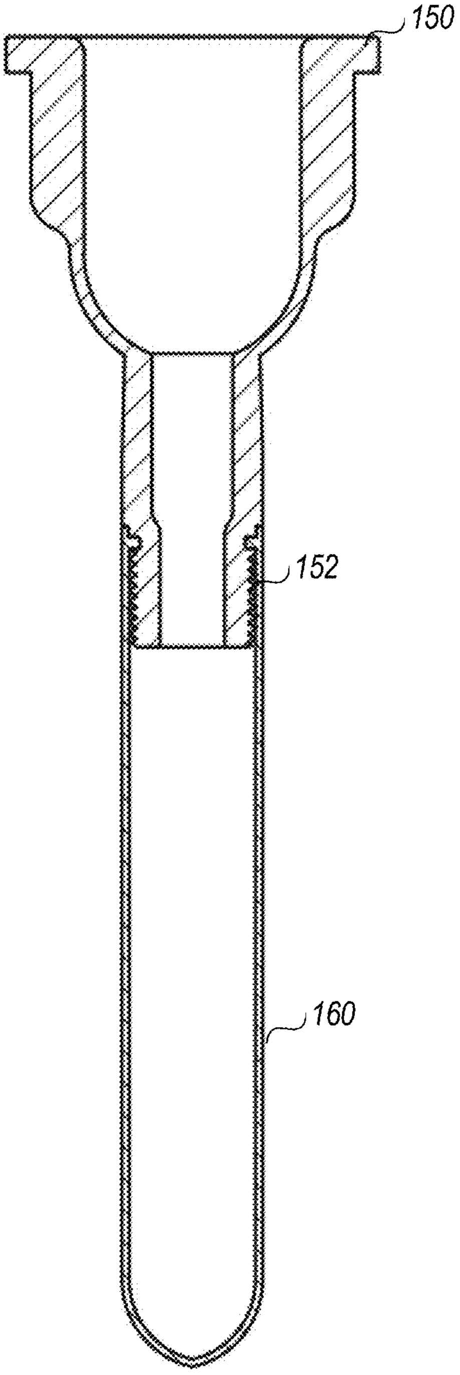

FIGS. 2A-2D are high-level schematic illustrations of a part of on-the-go carbonation device 100, according to some embodiments of the invention. FIGS. 2A and 2C are cross-section views of a part of on-the-go carbonation device 100 (with and without sealed container 110, respectively), which is sealably attachable to a bottle 80 (illustrated in a highly schematic manner, containing liquid 81 such as water, and see FIG. 5C for a photograph) and enables carbonating liquid 81 held in bottle 80. On-the-go carbonation device 100 may comprise a conduit 160 that accommodates gas passage 105 from the sealed container 110 (after releasing the gas from gas canister 90 and breaching of predetermined breaking point 135 in sealed container 110, e.g., as illustrated schematically by the broken arrows in FIG. 1A) to liquid 81 in bottle 80. Conduit 160 further comprises a carbonation element 165 (e.g., a carbonation stone or a carbonation nozzle) at an end of conduit 160 that contacts liquid 81 in bottle 80 and efficiently dissolve the gas (e.g., carbon dioxide, $CO_2$. nitrogen $N_2$, or other gases) into the liquid, creating a desired level of carbonation. Typically, carbonation element 165 is porous with many minute pores (e.g., a carbonation stone) or designed as a carbonation nozzle with many minute openings—through which the released pressurized gas diffuses into the liquid. The dimensions of conduit 160 and position, structure and materials of carbonation element 165 may be configured to provide a specified degree of carbonation with respect to the delivered gas pressure, and spatial relations of conduit 160 and carbonation element 165 to bottle 80 and the liquid in it, as determined by the structure of on-the-go carbonation device 100 and its attachment to bottle 80 (illustrated schematically in the following figures).

Figure 2D:
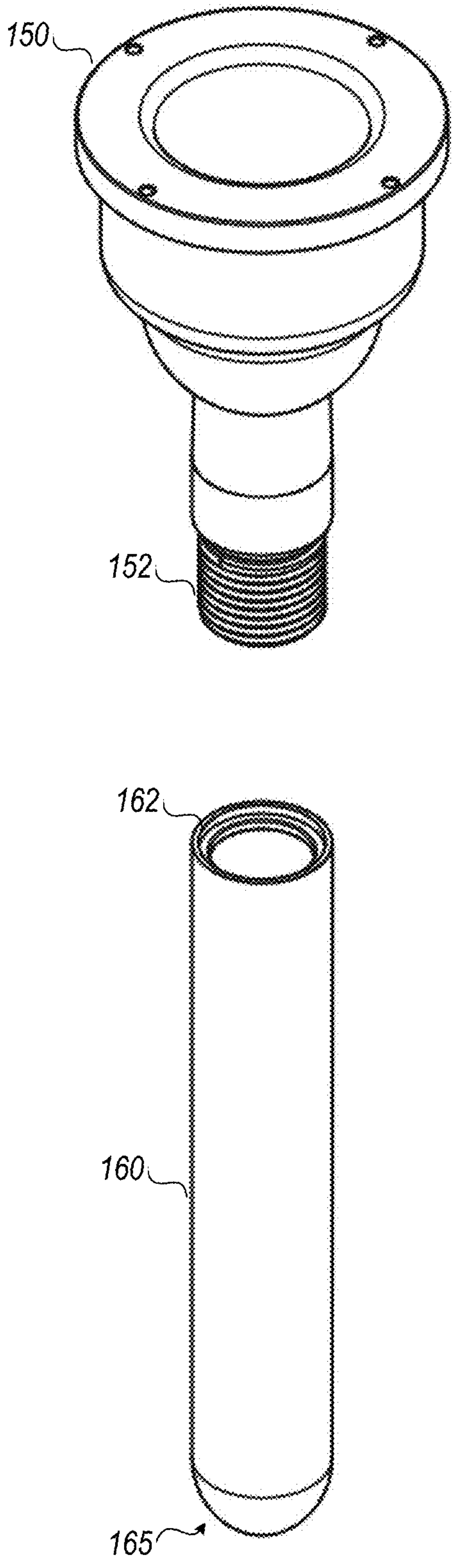

FIGS. 2B and 2D are exploded views of a part of on-the-go carbonation device 100 (with and without sealed container 110, respectively), with conduit 160 accommodating the gas passage from the gas canister into the bottle. An adapter 150 may be configured as a capsule receptacle to support sealed container 110 and accommodate the gas passage between sealed container 110 and conduit 160, as part of a housing illustrated schematically in the following figures. Adapter 150 may comprise a cavity for receiving sealed container 110 and provide a continuation for gas passage 105 of the released gas, allowing downwards movement thereof. Adapter 150 may be connected to conduit 160 (e.g., a leading pipe), e.g., through corresponding threads 152, 162, enabling attaching different lengths of conduits 160, depending on the type of bottle with which on-the-go carbonation device 100 is used (e.g., deeper and longer bottles may require longer conduit 160 than shorter bottles to ensure the correct positioning of carbonation element 165 within the bottle (e.g., in a lower part of the bottle). Adapter 150 may comprise one or more parts, e.g., for sealably attaching adapter 150 with sealed container 110 to the bottle with the liquid to be carbonated, e.g., supporting screwing threads and/or a pressure fitting between adapter 150 and bottle 80. In some embodiments, an inner diameter of adapter 150 may be at least in part smaller than an outer diameter of sealed container 110 (e.g., a capsule), to slightly deform sealed container 110 upon pressing it into adapter 150 to ensure stable attachment and correct positioning of sealed container 110.

Figure 3A:
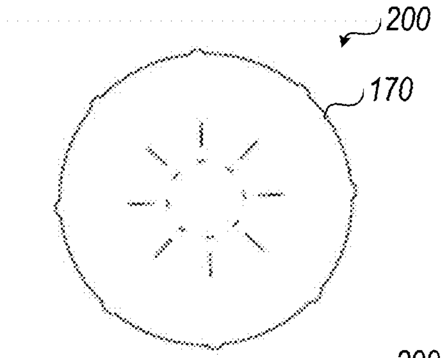
FIGS. 3A-3D are high-level schematic illustrations of a part of the on-the-go carbonation device including a housing configured to hold the sealed container and sealably attach the device to the bottle, according to some embodiments of the invention.
Figure 3B:
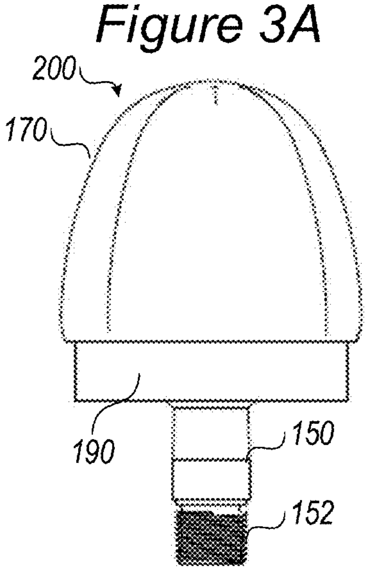
Figure 3C:
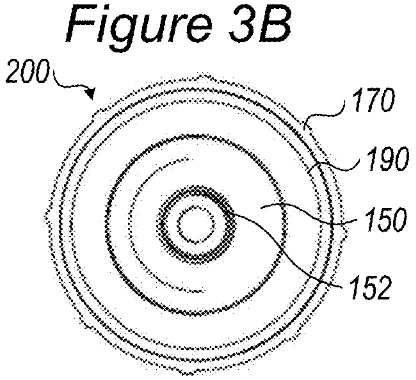
Figure 3D:
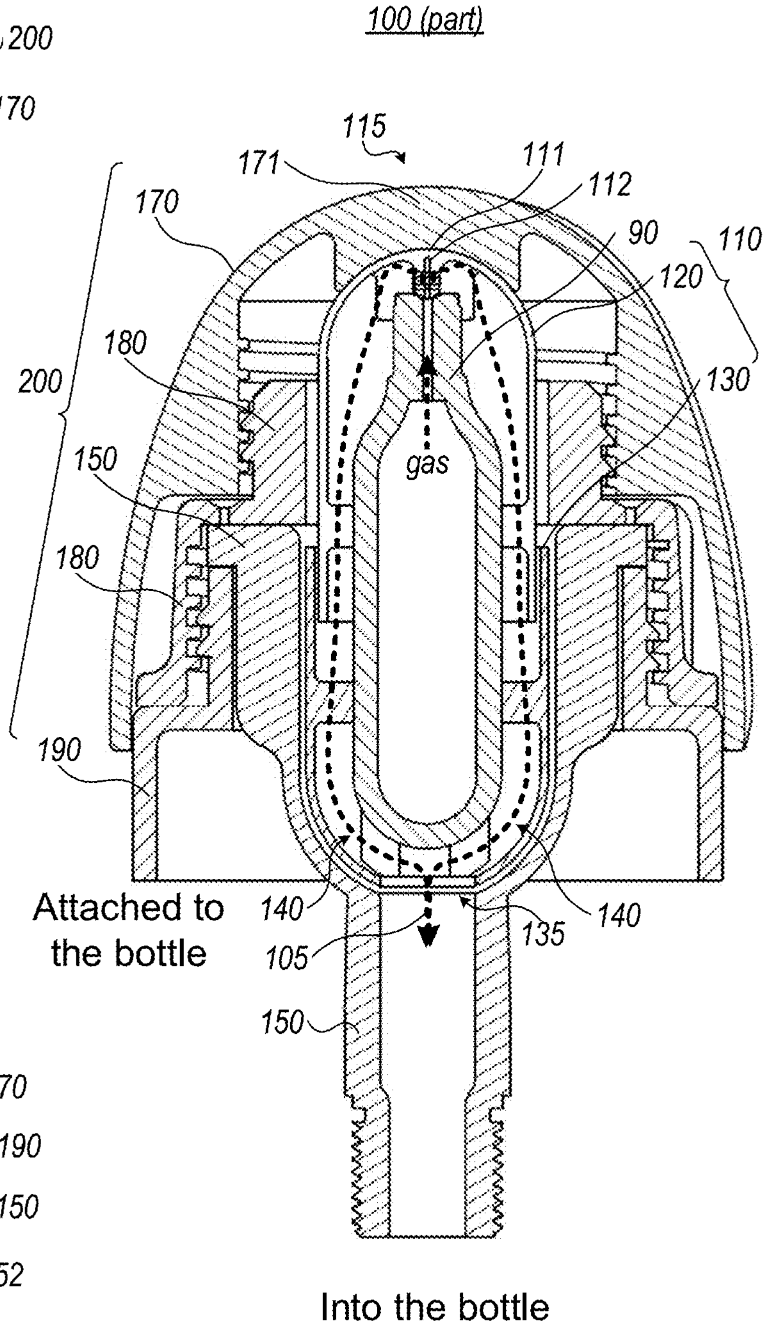

FIGS. 3A-3D are high-level schematic illustrations of a part of on-the-go carbonation device 100 including a housing 200 configured to hold sealed container 110 and sealably attach device 100 to the bottle, according to some embodiments of the invention. FIG. 3A is a top view of housing 200, FIG. 3B is a side view of housing 200, FIG. 3C is a bottom view of housing 200 and FIG. 3D is a cross-section view of housing 200.

Housing 200 may be configured to further enhance the functionality of on-the-go carbonation device 100 by providing effective actuation, adjustable attachment to one or more types of bottles 80 and corresponding effective delivery of gas and optionally additives 140 via gas passage 105 to carbonate and deliver additives 140 to the liquid in respective bottle 80.

In some embodiments, housing 200 may comprise a top cap 170, possibly comprising a top region 171 operable as actuator 115 and/or in association with actuator 115 on top of sealed container 110. For example, top region 171 may be flexible and enable pressing top cover 120 of sealed container 110 (which may be rigid and pressed against bottom cover 130) to actuate hollow pin 112 to open and release gas from gas canister 90 enclosed therewithin. In some embodiments, top cap 170 may be configured to cover at least part of adapter 150 (capsule receptacle), allow full or partial sealing of top part 120 and/or of the sealed container 110 and prevent, in part or in full, escape of fluids toward the top and redirect fluids such as released gas and additives 140 back down through gas passage 105. In various embodiments, actuation 115 may be carried out upon various actions applied onto various configurations of top cap 170, such as pressing (with or without deformation of top cap 170, rotating (in clock-wise and/or anti-clockwise direction) and possibly other or additional actions, e.g., as disclosed in illustrated embodiments.

Housing 200 may comprise a bottle connector 190 configured to provide a sealable connection to bottle 80 (e.g., via a pressure fitting, screwing threads or other types of connectors) and to support adapter 150 with conduit 160 (and carbonation element 165)—entering and being correctly positioned within bottle 80.

Housing 200 may further comprise at least one intermediate connector 180 configured to further support sealed container 110 and/or mediate mechanically between top cap 170, sealed container 110, bottle connector 190, adapter 150—and enable relative movement where specified (e.g., between top cap 170 and bottle 80), enhance usability and user friendliness (e.g., enhancing the look and feel of on-the-go carbonation device 100), enabling applicability and adjustment of on-the-go carbonation device 100 with respect to different types of bottles 80, and so forth. For example, adapter 150 and top cap 170 may comprise matching screwing threads configured to allow screwing top cap 170 onto adapter 150—directly or through intermediate connector(s) 180. Intermediate connector(s) 180 (comprising one or more parts) may engage with each other and with other parts of on-the-go carbonation device 100 (e.g., top cap 170, sealed container 110, bottle connector 190, adapter 150) using various types of connections, the thread connections illustrated in FIG. 3D provide a non-limiting example thereto.

In some embodiments (not illustrated), housing 200 may further comprise an opening and/or a mouthpiece configured to enable the user to directly drink the carbonated beverage from bottle 80 through housing 200 of on-the-go carbonation device 100. The opening and/or a mouthpiece may comprise sensor(s) configured to monitor amounts of liquid consumed by the user.

Figure 4A:
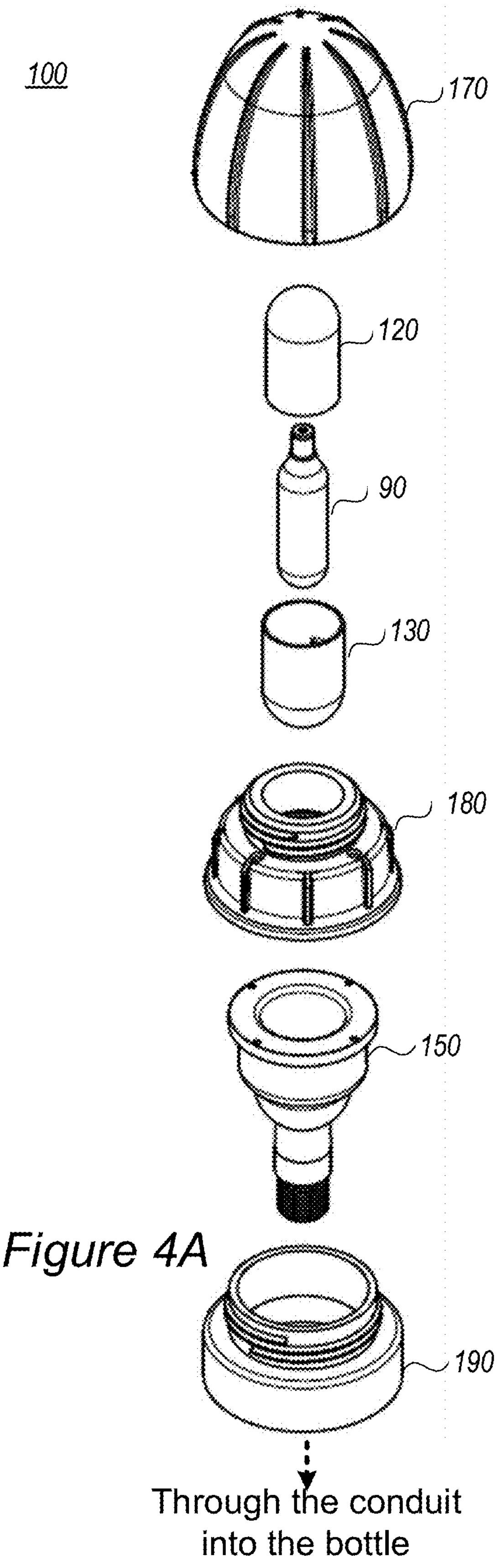
FIGS. 4A and 4B are exploded views of the upper section of the housing supporting the sealed container, according to some embodiments of the invention.
Figure 4B:
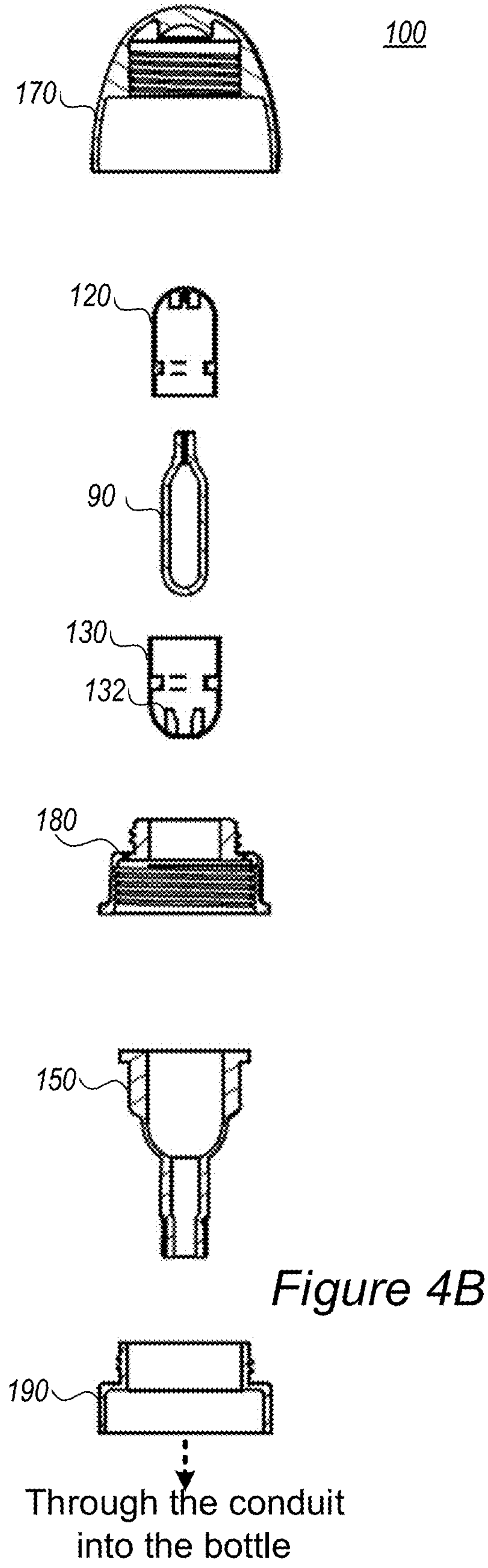

FIGS. 4A and 4B are exploded views of the upper section of housing 200 supporting sealed container 110, according to some embodiments of the invention. FIG. 4A provides an exploded perspective view and FIG. 4B provides an exploded cross-section view. FIGS. 4A and 4B illustrate schematically the main parts of on-the-go carbonation device 100, including top cover 120 and bottom cover 130 of sealed container 110 that support gas canister 90 and optionally hold additives 140, and housing 200 with top cap 170, bottle connector 190 and adapter 150, with intermediate connector(s) 180 that provide a robust structure attachable to bottle 80 and providing on-the-go carbonation to the liquid held within bottle 80.

Figures 5A, 5B, 5C:
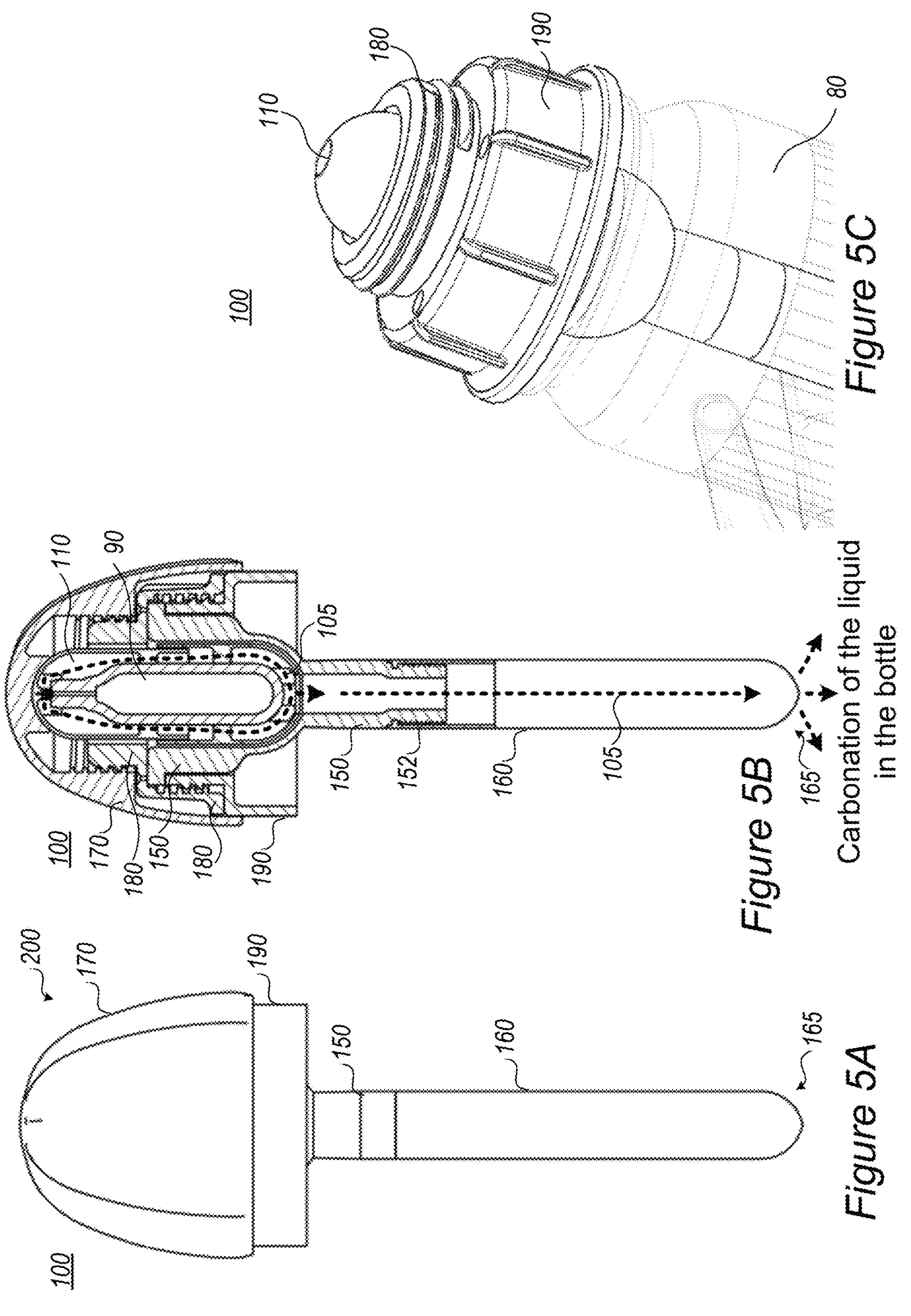
FIGS. 5A-5C are high-level schematic illustrations of on-the-go carbonation devices attached to a bottle, according to some embodiments of the invention.

FIGS. 5A-5C are high-level schematic illustrations of on-the-go carbonation device 100 attached to bottle 80, according to some embodiments of the invention. FIG. 5A is a side view, FIG. 5B is a cross-section view, and FIG. 5C is a photograph of some embodiments. In various embodiments, housing 200 may be configured to be sealably attached to bottle 80 and enable actuation of sealed container 110 to release gas from gas canister 90 through gas passage 105 (possibly carrying additives 140 with the released gas) and deliver the gas to carbonate the liquid in bottle 80, as disclosed herein. It is pointed out that on-the-go carbonation device 100 does not require any further device for its operation, and is thus much less cumbersome than present carbonation devices. Accordingly, on-the-go carbonation device 100 is easily transportable, providing portable, on-the-go carbonation (and optionally flavoring and nutritional supplementation) to liquids in the bottle, which may be re-used and adjusted by the user (e.g., replacing gas canisters 90 and adjusting additives 140). Moreover, on-the-go carbonation device 100 provides carbonation and delivery of additives (flavoring, supplements) in a single action—simplifying the immediate preparation of individually custom-prepared beverage. Finally, the mechanical structure of on-the-go carbonation device 100 and its parts allow adjusting it to fit various types of bottles 80 used by the same or different users.

In operation, a user may use a pre-prepared sealed container 110, e.g., in the form of a capsule, or prepare the user's own sealed container 110 (capsule) by choosing flavoring or supplement holding chambers with additives 140, placing a pressurized fluid cylinder (gas canister 90), and closing (sealably attaching) the two parts of the capsule (sealed container 110). The user may then place the capsule (sealed container 110) in the receptacle (adapter 150) and place the receptacle (adapter 150) in a bottle or other type of container with fluids such as water (or vice versa, place the receptacle, adapter 150, on the bottle and then placing the capsule, sealed container 110 in the receptacle—adapter 150). Once those are in place, the user may push down (or in some embodiments, twist) sealed container 110 to causes the top part of the capsule (top cover 120) to slide down into the bottom part of the capsule (bottom cover 130)—actuating (115) puncturing element (such as hollow pin 112) to puncture gas canister 90), and closing (sealably attaching)

the two parts of the capsule (sealed container 110). releasing the pressurized fluids (gas) into the cavity in top cover 120 and then down into flavoring or supplement holding chamber 140 along gas passage 105. The rise in pressure in sealed container 110 allows the puncturing of bottom seal (or seals) 135 to push the content of chambers 140 by the released pressure into bottle 80, carbonating the liquid and mixing additive(s) 140 into the liquid in bottle 80. In some embodiments, a deformation of bottom cover 130 upon being set into adapter 150 may alternatively or complementarily enable the puncturing of seal 135 and/or allow better releasing of the content of additive chambers 140.

FIG. 6-9B are high-level schematic illustrations of various configurations of on-the-go carbonation device 100, according to some embodiments of the invention. It is noted that elements from different disclosed design configurations may be modified or integrated from more than one specific illustrated embodiment.

In various embodiments, sealed enclosure 110 may comprise additive(s) 140 within sealed container 142 having at least one pre-defined breaking point 145 configured to burst and release additive(s) 140 upon the release of the gas from gas canister 90 along at least one fluid communication path that delivers additive(s) 140 by the released gas into the liquid. In various configurations, sealed container 142 may have pre-defined breaking point(s) 145 on one or multiple positions on sealed container 142. The fluid communication path(s) of additive(s) 140 into the liquid may at least partly coincide with a gas communication path from gas canister 90 to the liquid in bottle 80. The released gas may be configured to burst one or more pre-defined breaking point 145, e.g., by configuring the gas communication path to pass through sealed container 142 (see, e.g., FIGS. 6, 7 and 9), and/or by applying pressure on one or more pre-defined breaking point 145 that causes it to burst—for example accommodated by a gas bubble within liquid additive(s) 140 in sealed container 142, which is compressed to implode or explode by the applied pressure (see, e.g., FIGS. 8A, 8B and 9A, 9B). In some embodiments, the fluid communication path may be configured to splits off and then rejoins the gas communication path from gas canister 90 to the liquid in bottle 80—for example to create a delay between an initiation of the carbonation of the liquid by the released gas and the mixing of additive(s) 140 into the liquid (see, e.g., FIGS. 8A, 8B and 9A, 9B).

Figure 6:
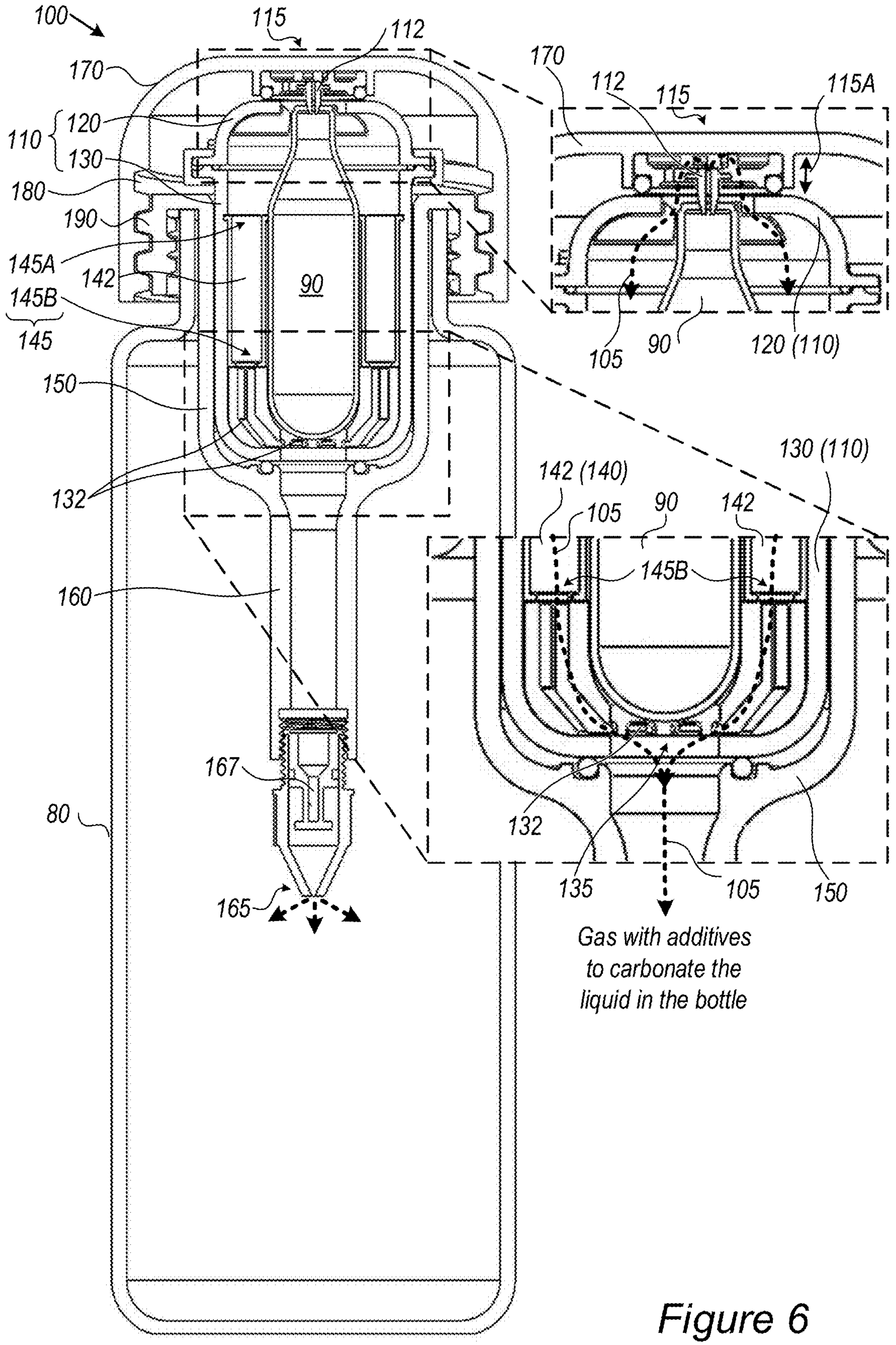
FIGS. 6, 7, 8A, 8B, 9A, 9B are high-level schematic illustrations of various configurations of on-the-go carbonation devices, according to some embodiments of the invention.

In various embodiments illustrated in FIG. 6-10, gas canister 90 comprises $CO_2$ at high pressure of at least 852.8 psi at 70° F./21.1° C., considered room temperature—in which $CO_2$ is in liquid phase. Upon puncturing or opening gas canister 90 as disclosed herein, the liquid $CO_2$ converts to a $CO_2$ gas when the pressure drops below 852.8 psi (at room temperature) and the gas, in an increasingly depressurizing state, dissolves into the water or other liquid in bottle 80. Valves in carbonation device 100 (e.g., 113, 167 as illustrated in various embodiments) are configured to open to allow excess gas to escape so as to keep the internal bottle pressure at a pressure range of between 90 psi and 115 psi at room temperature (medium pressure)—to ensure safety. For example, typically within conduit 160, the gas pressure may range between 852.8 psi and 115 psi (high pressure) and release valves 113 and/or 167 regulate the bottle pressure within a range of 90 psi to 115 psi (medium pressure) of gas entering the liquid within the bottle, FIG. 6 is a schematic illustration of on-the-go carbonation device 100, according to some embodiments of the invention. On-the-go carbonation device 100 may comprise gas canister 90 (e.g., a cartridge containing 8 grams compressed $CO_2$) in an upright position and sealed within sealed container 110 (e.g., a pod), which may further enclose one or more container(s) 142 of additives 140 (e.g., which may contain up to 15 grams of concentrated syrup). Sealed enclosure 110 may comprise bottom cover 130 attached to top cover 120 and may comprise supports 132 for holding and affixing container(s) 142 and/or gas canister 90 in a predefined position within sealed enclosure 110. Sealed enclosure 110 may be configured in a way that enables re-use, e.g., sealed enclosure 110 may be opened, and additives' container(s) 142 and/or gas canister 90 may be replaced after use. Container(s) 142 of additives 140 may be configured to have a toroidal (donut) shape configured to accommodate gas canister 90 at its middle, as illustrated schematically. Container(s) 142 may be sealed with foil diaphragms, e.g. in order to preserve the syrup against external degrading influence. The foil diaphragms may comprise one or more seals 145 configured as predetermined breaking points, which are breached upon release of the gas from canister 90—causing release of additives 140 from container(s) 142.

Actuation 115 of on-the-go carbonation device 100 may be carried out by a rotation movement of top cap 170 (e.g., in a clockwise direction), configured to puncture or open a valve in gas canister 90, e.g., by hollow pin 112 that is pushed due to the rotation. Sealed enclosure 110 may be further configured to direct the compressed gas (e.g., $CO_2$) exiting canister 90 upwards—to consecutively flow downwards (see dashed arrow 105 denoting the general direction of gas flow) towards container(s) 142 containing additives 140 such as syrup. Seals 145 in container(s) 142 may be configured to rupture upon contacting the flowing gas 105, e.g., an upper foil seal 145A may burst first, forcing additives 140 to move downwards and further causing a lower foil seal 145B of container(s) 142 to burst—forcing the combined stream of high pressure gas and additives 140 (e.g., syrup) to flow downwards (denoted 105, with mostly overlapping gas and fluid communication paths) through conduit 160 (which may be part of adapter 150) and towards a check valve 167 configured to open upon arrival of the combined stream high pressure gas and additives 140 (e.g., syrup) and release the gas and additives through carbonation element 165 into the water contained inside bottle 80. The contact of the combined high-pressure gas and additives 140 carbonates the water, and at the same time, mixes additives 140 (e.g., syrup) into the water. It is noted that check valve 167 may be configured to prevent the backward flow of the mixture back into conduit 160 and other parts of carbonation device 100.

In the illustrated non-limiting design, the body of carbonation device 100 that encloses sealed container 110 (e.g., a pod) that is actuated by rotating top cap 170—may comprise adapter 150 that is designed to provide connector 190 to bottle 80, with intermediate connector(s) 180. Upon releasing carbonation device 100 off bottle 80 (e.g., by rotation in the opposite direction, releasing the attachment of adapter 150 (with connector 190) off bottle 80, the user may pour or drink the carbonated mixture out of bottle 80. Carbonation device 100 may be further used to re-seal bottle 80 with the carbonated mixture.

Figure 7:
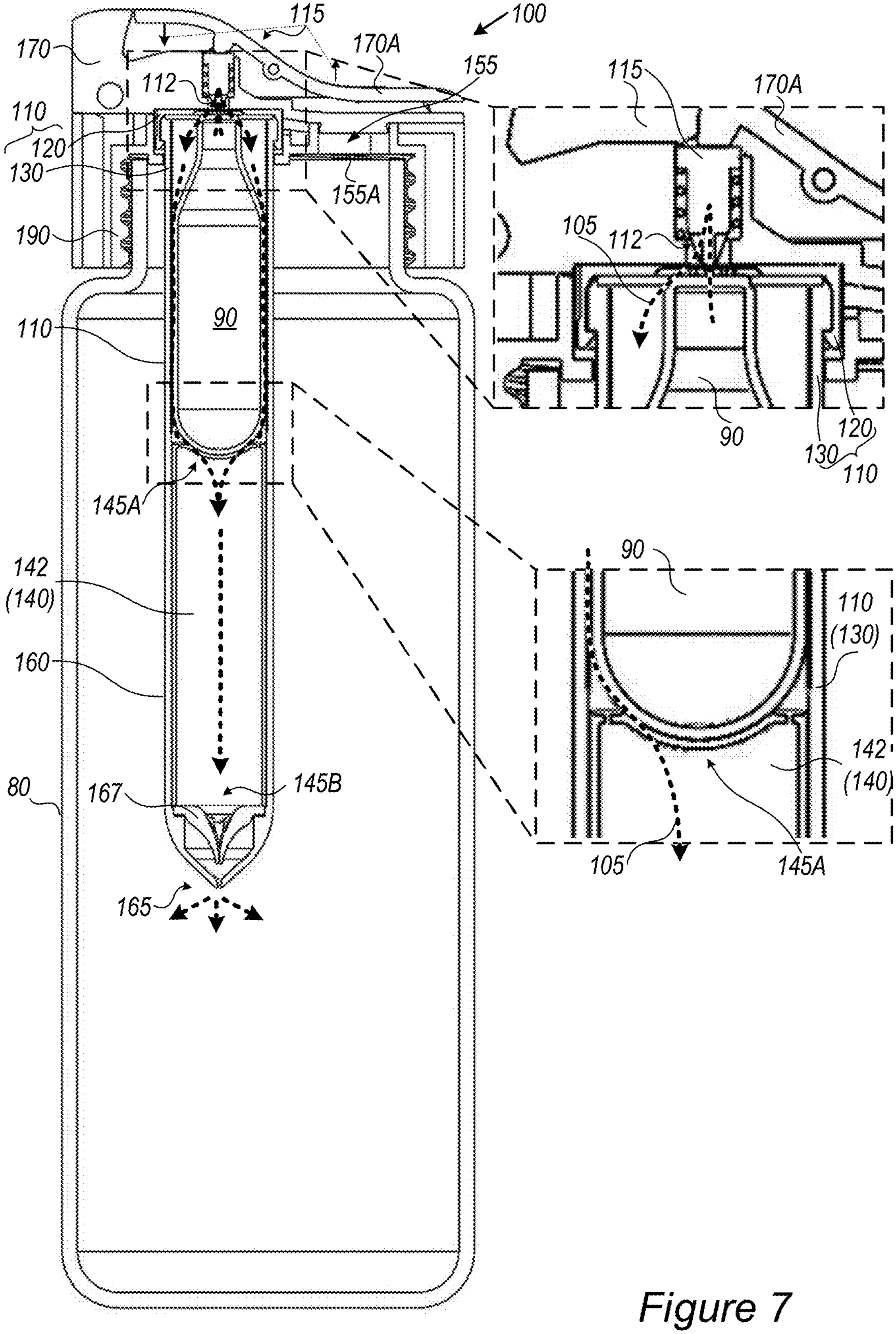

FIG. 7 is a schematic illustration of on-the-go carbonation device 100, according to some embodiments of the invention. On-the-go carbonation device 100 may comprise gas canister 90 (e.g. a cartridge containing 8 grams compressed $CO_2$) in an upright position and sealed within sealed container 110 (e.g., a pod), which may further enclose one or more container(s) 142 of additives 140 (e.g., which may contain up to 15 grams of concentrated syrup). Sealed enclosure 110 may comprise bottom cover 130 (e.g., in form of an elongated tube) attached to top cover 120 (e.g., in form of a covering cap) and may comprise supports 132 for holding and affixing container(s) 142 and/or gas canister 90 in a predefined position within sealed enclosure 110. Sealed enclosure 110 may be configured in a way that enables re-use, e.g., sealed enclosure 110 may be opened, and additives' container(s) 142 and/or gas canister 90 may be replaced after use. Container(s) 142 of additives 140 may be configured to have a tubular shape configured to be positioned beneath gas canister 90, as illustrated schematically. Container(s) 142 may be sealed with foil diaphragms, e.g. in order to preserve the syrup against external degrading influence. The foil diaphragms may comprise one or more seals 145 configured as predetermined breaking points, which are breached upon release of the gas from canister 90—causing release of additives 140 from container(s) 142.

Actuation 115 of on-the-go carbonation device 100 may be carried out by pulling (e.g., upwards) of a hinged lever 170A that is part of top cap 170 (see, e.g., the movements denoted by arrows), configured to puncture or open a valve in gas canister 90, e.g., by hollow pin 112 that is pushed due to the rotation. Sealed enclosure 110 may be further configured to direct the compressed gas (e.g., $CO_2$) exiting canister 90 upwards—to consecutively flow downwards (see dashed arrow 105 denoting the general direction of gas flow around gas canister) towards container(s) 142 containing additives 140 such as syrup. Seal(s) 145 (upper seal 145A and lower seal 145B) in container(s) 142 may be configured to rupture upon contacting the flowing gas 105, e.g., upper foil seal 145A may burst first, forcing additives 140 to move downwards and further causing a lower foil seal 145B of container(s) 142 to burst—forcing the combined stream of high pressure gas and additives 140 (e.g., syrup) to flow downwards (denoted 105, with the fluid communication path overlapping the second part of the gas communication path) towards check valve 167 configured to open upon arrival of the combined stream high pressure gas and additives 140 (e.g., syrup) and release the gas and additives through carbonation element 165 into the water contained inside bottle 80. The contact of the combined high-pressure gas and additives 140 carbonates the water, and at the same time, mixes additives 140 (e.g., syrup) into the water. It is noted that check valve 167 may be configured to prevent the backward flow of the mixture back into conduit 160 (which may be part of adapter 150) and other parts of carbonation device 100.

In the illustrated non-limiting design, the body of carbonation device 100 that encloses sealed container 110 (e.g., a pod) that is actuated by pressing hinged lever 170A of top cap 170—may comprise connector 190 to bottle 80, without intermediate connector(s) 180. Upon releasing carbonation device 100 off bottle 80 (e.g., by rotation in the opposite direction, releasing the attachment of connector 190 off bottle 80, the user may pour or drink the carbonated mixture out of bottle 80. Carbonation device 100 may be further used to re-seal bottle 80 with the carbonated mixture. Alternatively or complementarily, the body of carbonation device 100 (e.g., connector 190) may comprise a sealable opening 155 that may be used to drink the carbonated mixture directly out of bottle 80 with carbonation device 100 attached to it. Opening 155 may be sealed by a lid 155A configured to be closed to reseal the carbonated mixture within bottle 80.

Figure 8A:
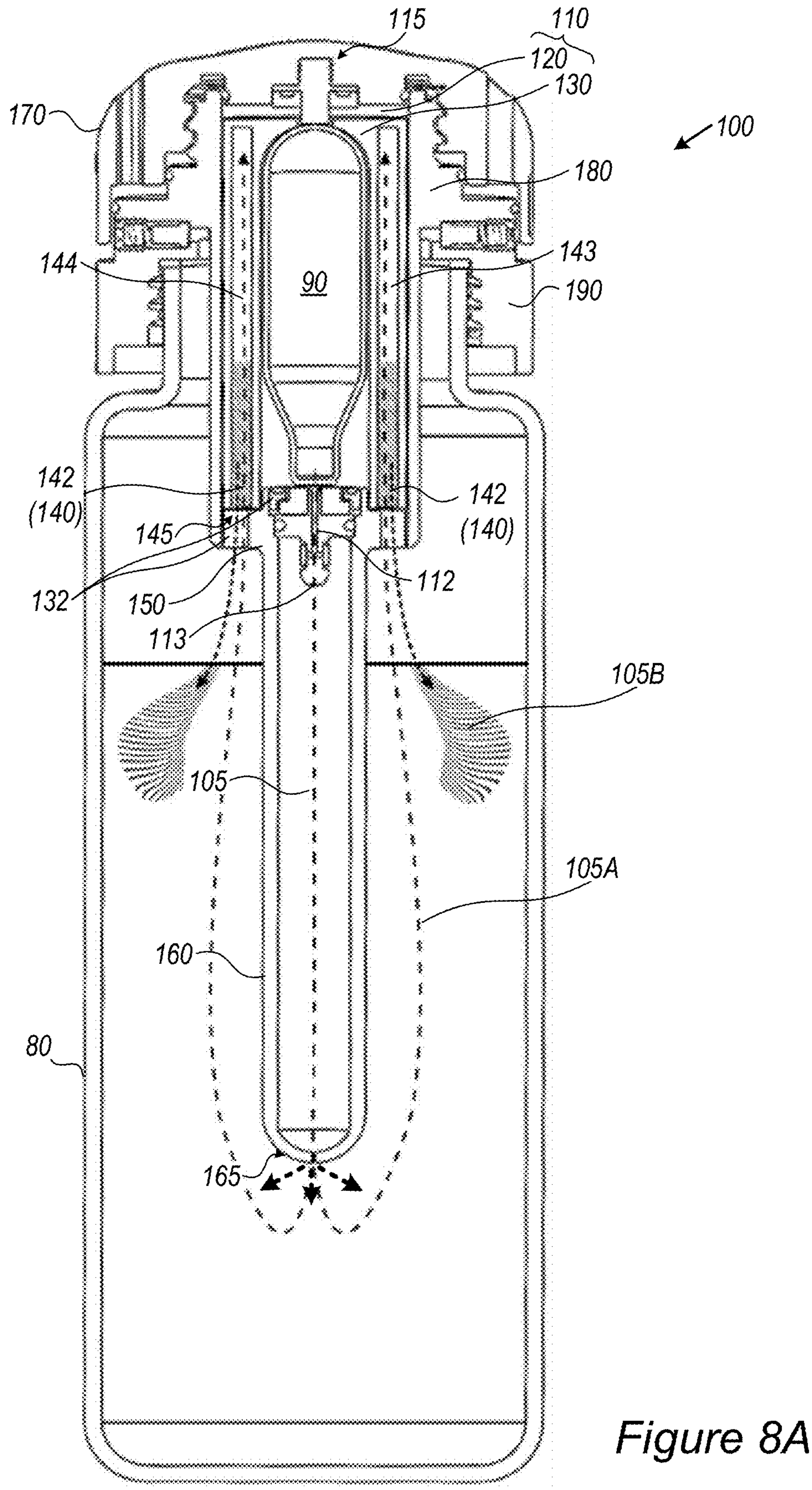
Figure 8B:
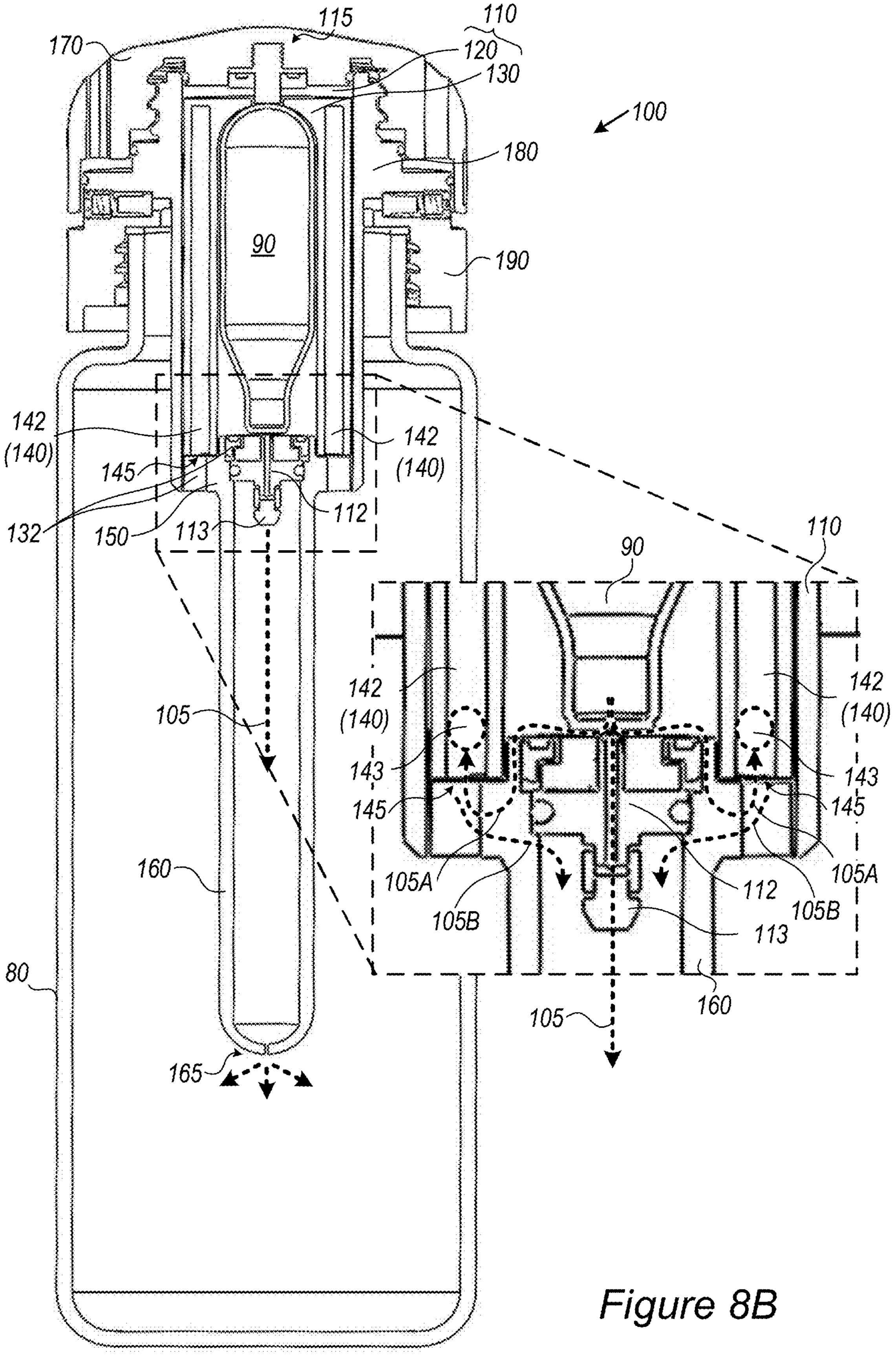

FIGS. 8A and 8B are schematic illustrations of on-the-go carbonation device 100, according to some embodiments of the invention. On-the-go carbonation device 100 may comprise gas canister 90 (e.g. a cartridge containing 8 grams compressed $CO_2$) in an upside-down position (with the opening or valve thereof directed towards the bottle) and sealed within sealed container 110 (e.g., a pod), which may further enclose one or more container(s) 142 of additives 140 (e.g., which may contain up to 15 grams of concentrated syrup). Sealed enclosure 110 may comprise bottom cover 130 attached to top cover 120 and may comprise supports 132 for holding and affixing container(s) 142 and/or gas canister 90 in a predefined position within sealed enclosure 110. Sealed enclosure 110 may be configured in a way that enables re-use, e.g., sealed enclosure 110 may be opened, and additives' container(s) 142 and/or gas canister 90 may be replaced after use. Container(s) 142 of additives 140 may be configured to have a toroidal (donut) shape configured to accommodate gas canister 90 at its middle, as illustrated schematically. Container(s) 142 may be sealed with foil diaphragms, e.g. in order to preserve the syrup against external degrading influence. The foil diaphragms may comprise one or more seals 145 configured as predetermined breaking points, which are breached upon release of the gas from canister 90—causing release of additives 140 from container(s) 142. Container(s) 142 may contain a pocket (or bubble) 143 (above additives 140 as illustrated schematically in FIG. 8A, or possibly below additives 140 as illustrated schematically in FIG. 8B) of inert gas at ambient pressure in addition to syrup 140—configured to be imploded upon application of external pressure and tear seal(s) 145, as disclosed herein.

Actuation 115 of on-the-go carbonation device 100 may be carried out by a rotation movement of top cap 170 (e.g., in a clockwise direction), configured to puncture or open a valve in gas canister 90, e.g., by hollow pin 112 that is pushed due to the rotation. Sealed enclosure 110 may be further configured to direct the compressed gas (e.g., $CO_2$) exiting canister 90 downwards and into the liquid in bottle 80 (see dashed arrow 105 denoting the general direction of gas flow) and carbonates the liquid via carbonation element 165. For example, high-pressure gas may be forced through valve 113 in the direction of conduit 160 and into the liquid. Within conduit 160, the gas pressure may range between 852.8 psi and 115 psi (high pressure). Once within the bottle, release valves 113 may be configured to regulate the bottle pressure within a range of 90 psi to 115 psi (medium pressure).

FIG. 8A schematically illustrates embodiments in which some of the gas (denoted 105A in FIG. 8A) released into the liquid—being released as gas 105 back above the liquid and into container(s) 142, breaking seal 145 and releasing additives 140 from container(s) 142 into the liquid in the bottle (denoted 105B in FIG. 8A). After gas canister 90 is punctured, the gas may flow through the nozzle 165 into the liquid in bottle 80 thereby increasing the pressure in bottle 80. Being of a higher pressure than the gas pocket 144 in container(s) 142, gas flow 105B causes the rupture of seal(s) 145. Upon rupture of seal(s) 145, gas now bubbles up through additives 140 inside container(s) 142—displacing additives 140 out of container(s) 142 and into the liquid in bottle 80. It is noted that check valve 113 may be configured to prevent the backward flow of the mixture and thus prevent contamination of parts of carbonation device 100.

FIG. 8B schematically illustrates embodiments in which at least some of the gas exiting canister 90 may move towards container(s) 142 containing additives 140 such as syrup (see dashed arrow 105A in FIG. 8A, denoting the general direction of gas flow). Seal(s) 145 in container(s)

142 may be configured to rupture upon contacting the flowing gas 105A, e.g., upon medium gas pressure (e.g., between 90 psi and 115 psi at room temperature) of gas 105A. Bubble 143 may be configured to implode upon the pressure application by gas 105A (e.g., due to the compressibility of the inert gas in bubble 143, which is at a relatively low pressure within container(s) 142 as compared to the medium pressure of gas 105A)—causing rupture of seal(s) 145. Upon rupture of seal(s) 145, gas 105A may proceed into container(s) 142, removing additives 140 therefrom (e.g., bubbling up through syrup 140, displacing syrup 140 from within container(s) 142, and forcing syrup 140 downwards through already-burst foil 145) and delivering additives 140 (indicated schematically by arrows 105B) into the liquid in bottle 80. First gas flow 105A (gas communication path) may be configured to initiate carbonation, while second gas flow 105B (fluid communication path) may be configured to deliver additives 140 and mix them into the water, and further carbonate the water or other liquid in bottle 80. It is noted that check valve 113 may be configured to prevent the backward flow of the mixture and thus prevent contamination of parts of carbonation device 100.

In the illustrated non-limiting designs, the body of carbonation device 100 that encloses sealed container 110 (e.g., a pod) that is actuated by pressing top cap 170—may comprise connector 190 to bottle 80, attached to top cap 170 via intermediate connector(s) 180. Conduit 160 may be part and continuation of adapter 150 that supports sealed container 110. Some embodiments of carbonation device 100 may comprise sealable opening 155 (not shown) for drinking the prepared liquid out of the bottle, which may be sealed by lid 155A configured to be closed to reseal the carbonated mixture within bottle 80—similar to embodiments illustrated in FIG. 7.

Figure 9A:
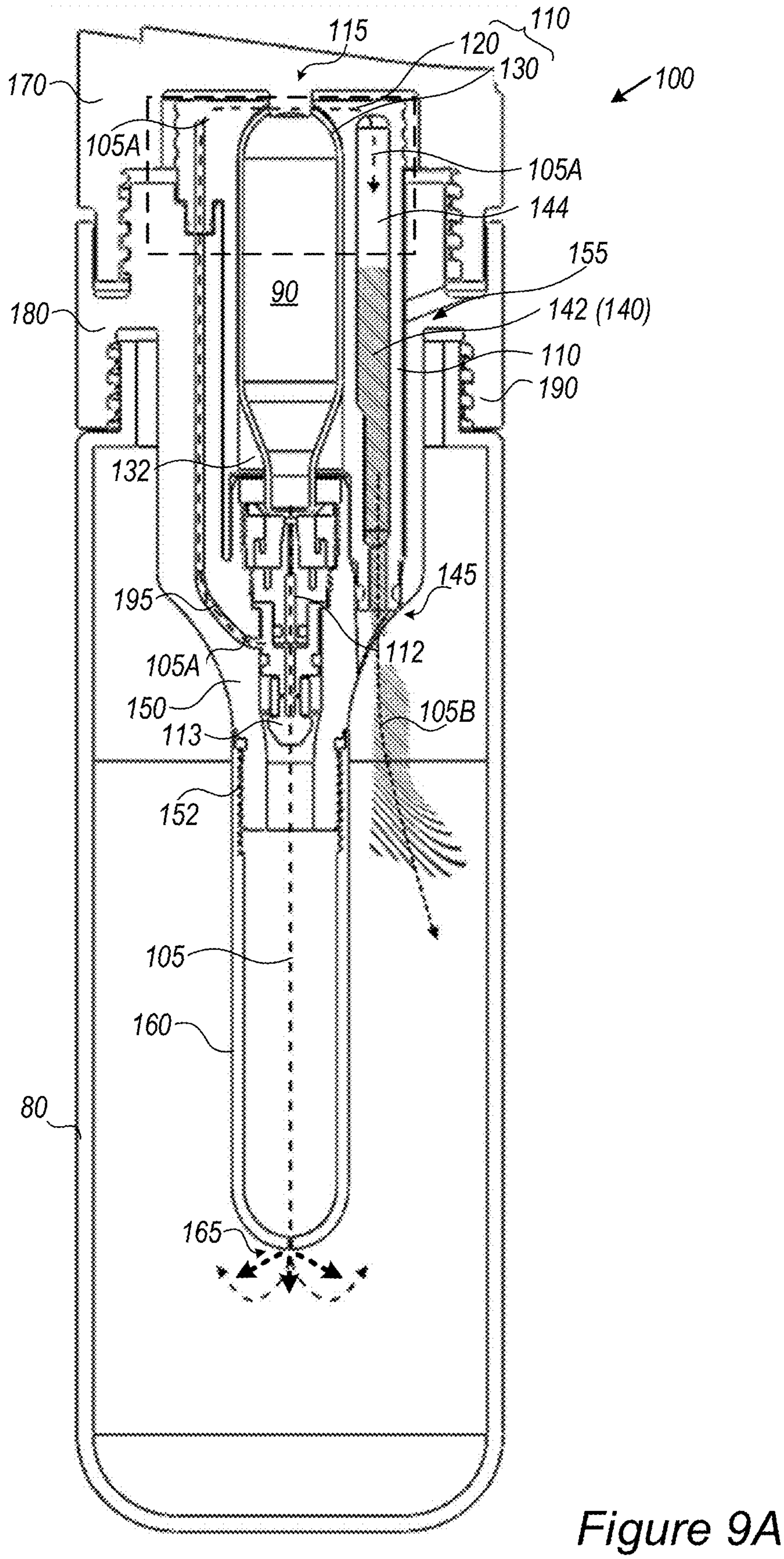
Figure 9B:
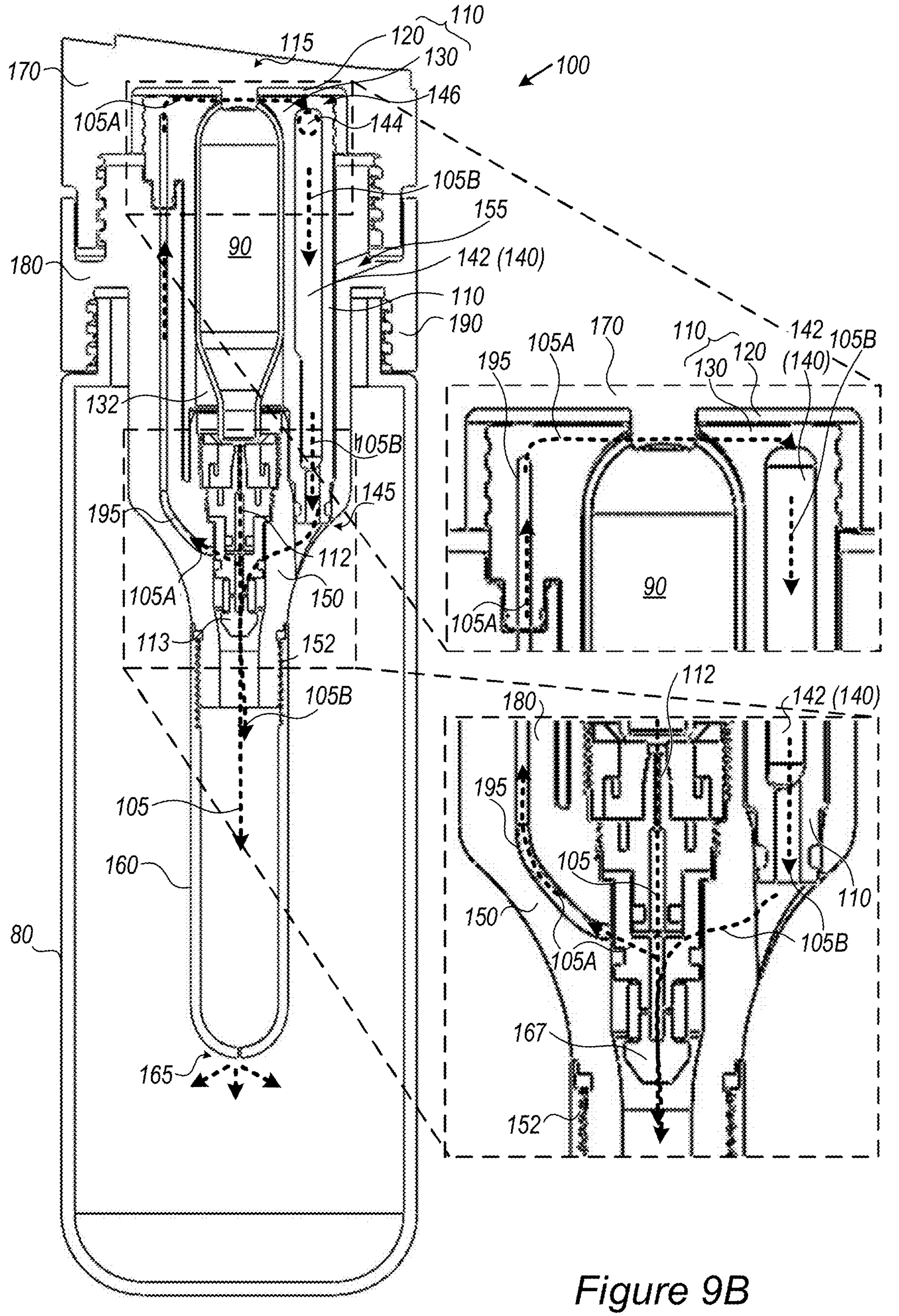

FIGS. 9A and 9B are schematic illustrations of on-the-go carbonation device 100, according to some embodiments of the invention. On-the-go carbonation device 100 may comprise gas canister 90 (e.g. a cartridge containing 8 grams compressed $CO_2$) in an upside-down position (with the opening or valve thereof directed towards the bottle) and sealed within sealed container 110 (e.g., a pod), which may further enclose one or more container(s) 142 of additives 140 (e.g., which may contain up to 15 grams of concentrated syrup). Sealed enclosure 110 may comprise bottom cover 130 attached to top cover 120 and may comprise supports 132 for holding and affixing container(s) 142 and/or gas canister 90 in a predefined position within sealed enclosure 110.

Container(s) 142 of additives 140 may be configured to have a full or partial toroidal shape (donut or part thereof) configured to accommodate gas canister 90 at its middle (or on its side), as illustrated schematically. Container(s) 142 may be sealed with foil diaphragms, e.g. in order to preserve the syrup against external degrading influence. The foil diaphragms may comprise one or more seals 145 (e.g., upper seal 145A and lower seal 145B) configured as predetermined breaking points, which are breached upon release of the gas from canister 90—causing release of additives 140 from container(s) 142.

Actuation 115 of on-the-go carbonation device 100 may be carried out by a rotation movement of top cap 170 (e.g., in a clockwise direction), configured to puncture or open a valve in gas canister 90, e.g., by hollow pin 112 that is pushed due to the rotation. Sealed enclosure 110 may be further configured to direct the compressed gas (e.g., $CO_2$) exiting canister 90 downwards and into the liquid in bottle 80 (see dashed arrow 105 denoting the general direction of gas flow) and carbonates the liquid via carbonation element 165. For example, high-pressure gas may be forced through valve 113 in the direction of conduit 160 and into the liquid. Within conduit 160, the gas pressure may range between 852.8 psi and 115 psi (high pressure). Once within the bottle, release valves 113 may be configured to regulate the bottle pressure within a range of 90 psi to 115 psi (medium pressure).

Additionally, at least some of the gas exiting canister 90 may move through an internal channel 195 within sealed enclosure 110 towards the top of container(s) 142 containing additives 140 such as syrup. Dashed arrow 105A denotes schematically the general direction of gas flow to and through channel 195 and then from channel 195 to the top of container(s) 142, e.g., through an opening 146 (which may be sealable) that lets flowing gas 105A enter container(s) 142 and enables the gas to push additives 140 through container(s) 142. An air bubble 144 above additives 140 at the top of container(s) 142 may be configured to explode upon the pressure applied by gas stream 105A—causing the rupture of bottom seal(s) 145 and pushing gas stream 105B to expel additives 140 out of container(s) 142.

In embodiments illustrated in FIG. 9A, gas with additives (denoted 105B) exits carbonation device 100 directly into the liquid in bottle 80. For example, separate gas stream 105 may be delivered to carbonate the liquid in bottle 80, while delayed gas and additive stream 105B (carried by gas stream 105A diverted upward through channel 195 and into container(s) 142) may be introduced into the liquid through burst seal 145 and mixed into the liquid (it is noted that in such embodiments, seal 145 provides a pre-defined rupture point for both container(s) 142 and the body of carbonation device 100, positioned e.g., in adapter 150. First gas flow 105 may be configured to initiate carbonation, while second gas flow 105A may be configured to deliver additives 140 and mix them into the water via stream 105B.

In embodiments illustrated in FIG. 9B, gas with additives (indicated schematically by arrow 105B, the gas communication path 105 splits into one part 105 carbonating the fluid and a second part 105A actuating and turning into the fluid communication path 105B). The gas correspondingly forces additives 140 (e.g., syrup) through valve 167 and into the liquid in bottle 80. First gas flow 105A may be configured to initiate carbonation, while second gas flow 105B may be configured to deliver additives 140 and mix them into the water, and further carbonate the water or other liquid in bottle 80.

It is noted that in any of the embodiments, check valve 167 may be configured to prevent the backward flow of the mixture and thus prevent contamination of parts of carbonation device 100.

In the illustrated non-limiting design, the body of carbonation device 100 that encloses sealed container 110 (e.g., a pod) that is actuated by pressing top cap 170—may comprise connector 190 to bottle 80, attached to top cap 170 via intermediate connector(s) 180. Conduit 160 may be part and continuation of adapter 150 that supports sealed container 110.

Upon releasing carbonation device 100 off bottle 80 (e.g., by rotation in the opposite direction, releasing the attachment of top cap 170 off bottle 80, the user may pour or drink the carbonated mixture out of bottle 80. Carbonation device 100 may be further used to re-seal bottle 80 with the carbonated mixture. Alternatively or complementarily, the body of carbonation device 100 (e.g., intermediate connector(s) 180) may comprise a sealable opening 155 that may be used to drink the carbonated mixture directly out of bottle 80 with carbonation device 100 attached to it. Opening 155 may be sealed by re-placing intermediate connector(s) 180 to reseal the carbonated mixture within bottle 80.

Figure 10:
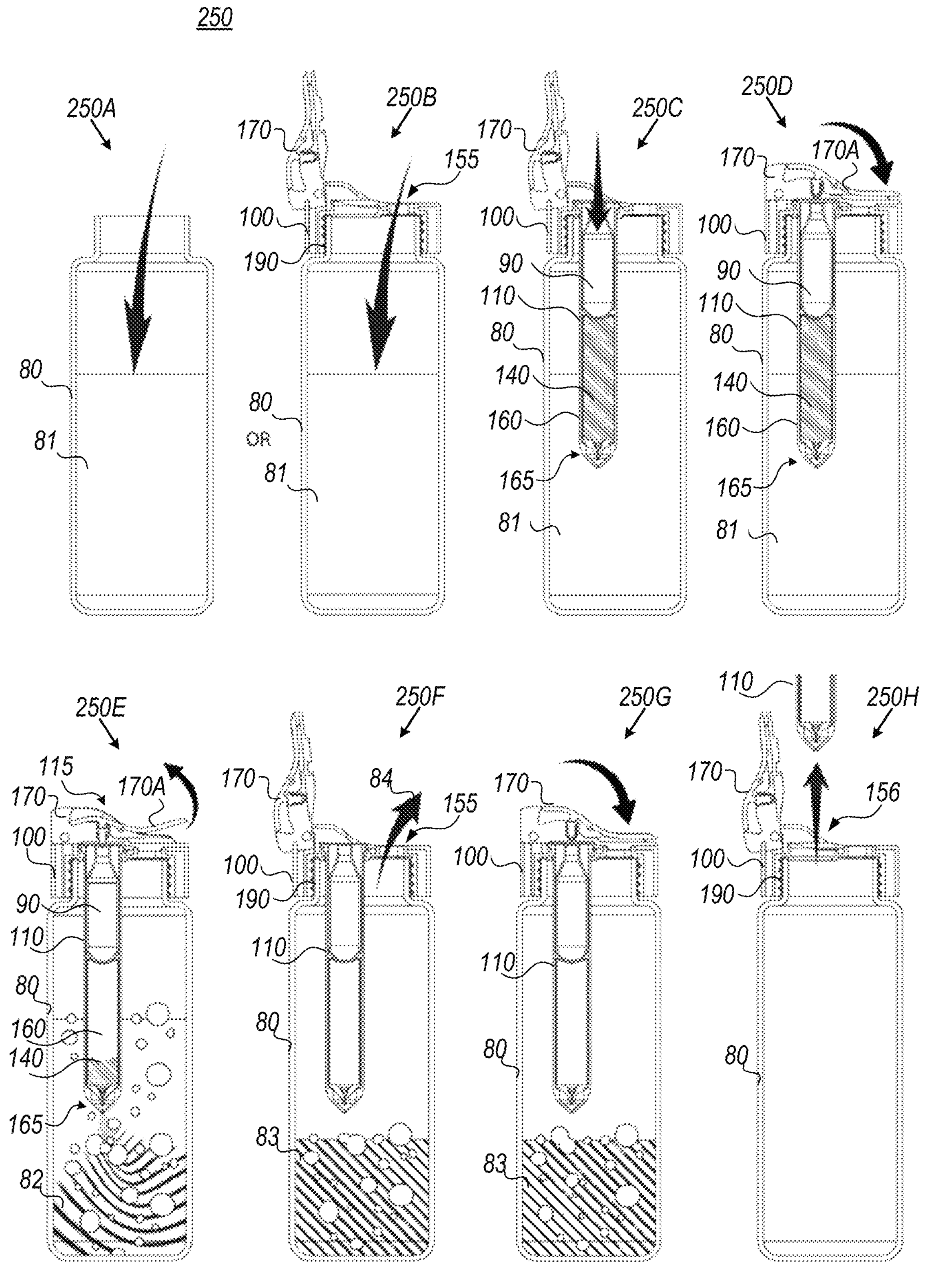
FIG. 10 is a high-level set of schematic illustrations of use stages of on-the-go carbonation devices, according to some embodiments of the invention.

FIG. 10 is a high-level set of schematic illustrations of use stages 250 of on-the-go carbonation device 100, according to some embodiments of the invention. While illustrated configuration of on-the-go carbonation device 100 corresponds to embodiments depicted in FIG. 7, it is emphasized that similar use stages 250 (within minor adjustments disclosed herein) are applicable to other, most or all embodiments of on-the-go carbonation device 100, depending on specific, non-limiting configuration details thereof.

Use stages 250 are illustrated schematically, in a non-limiting manner, to depict the following stages. Stages 250A and 250B illustrate schematically the filling of liquid 81 (e.g., water) into bottle 80, either directly or through opening 155 in some embodiments of on-the-go carbonation device 100 (e.g., attached by bottle connector 190 to bottle 80, e.g., by clockwise rotation, with open top lid 170), respectively. Sealed enclosure 110 (e.g., as a pod, enclosing gas canister 90 and additives' container(s) 142, and supported by adapter 150 with conduit 160 and carbonation element 165) may then be set onto bottle 80 (stage 250C) and top cap 170 may be used to affix sealed enclosure 110 in place and seal on-the-go carbonation device 100 attached to bottle 80 (stage 250D), with carbonation element 165 placed within liquid 81.

Upon actuation 115 (stage 250E), e.g., in the non-limiting example by lever 170A that is part of top cap 170, gas from canister 90 and additives 140 emptied from container(s) 142 are introduced, carbonate and are mixed into liquid 81 (indicated schematically by numeral 82) to yield a user-specified drink 83—prepared and ready to drink, e.g., through opening 155 in on-the-go carbonation device 100—denoted schematically by arrow 84 illustrated in stage 250F. The user may then keep the rest of drink 83 sealed within bottle 80 with on-the-go carbonation device 100 (e.g., for further drinking), as illustrated in stage 250G, and/or upon requirement remove sealed enclosure 110 from on-the-go carbonation device 100, e.g., using a sealable opening 156 configured to enable replacing the gas canister without removing the device off the bottle (stage 250H, e.g., releasing the seal by counter-clockwise rotation), e.g., to be replaced by fresh sealed enclosure 110 (stage 250B) after re-filling bottle 80 with liquid 81 (stage 250A or 250B).

Figure 11A:
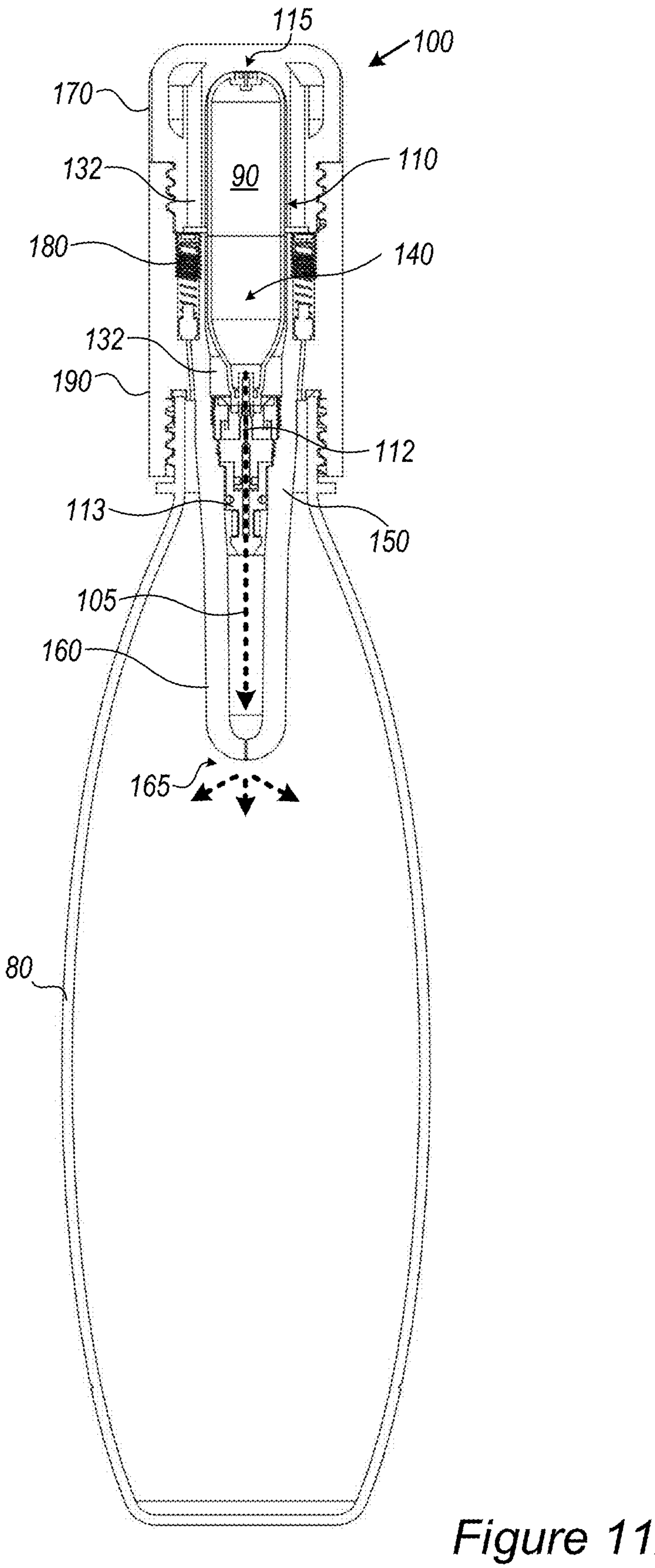
FIGS. 11A and 11B are high-level schematic illustrations of on-the-go carbonation devices and use stages thereof, according to some embodiments of the invention.
Figure 11B:
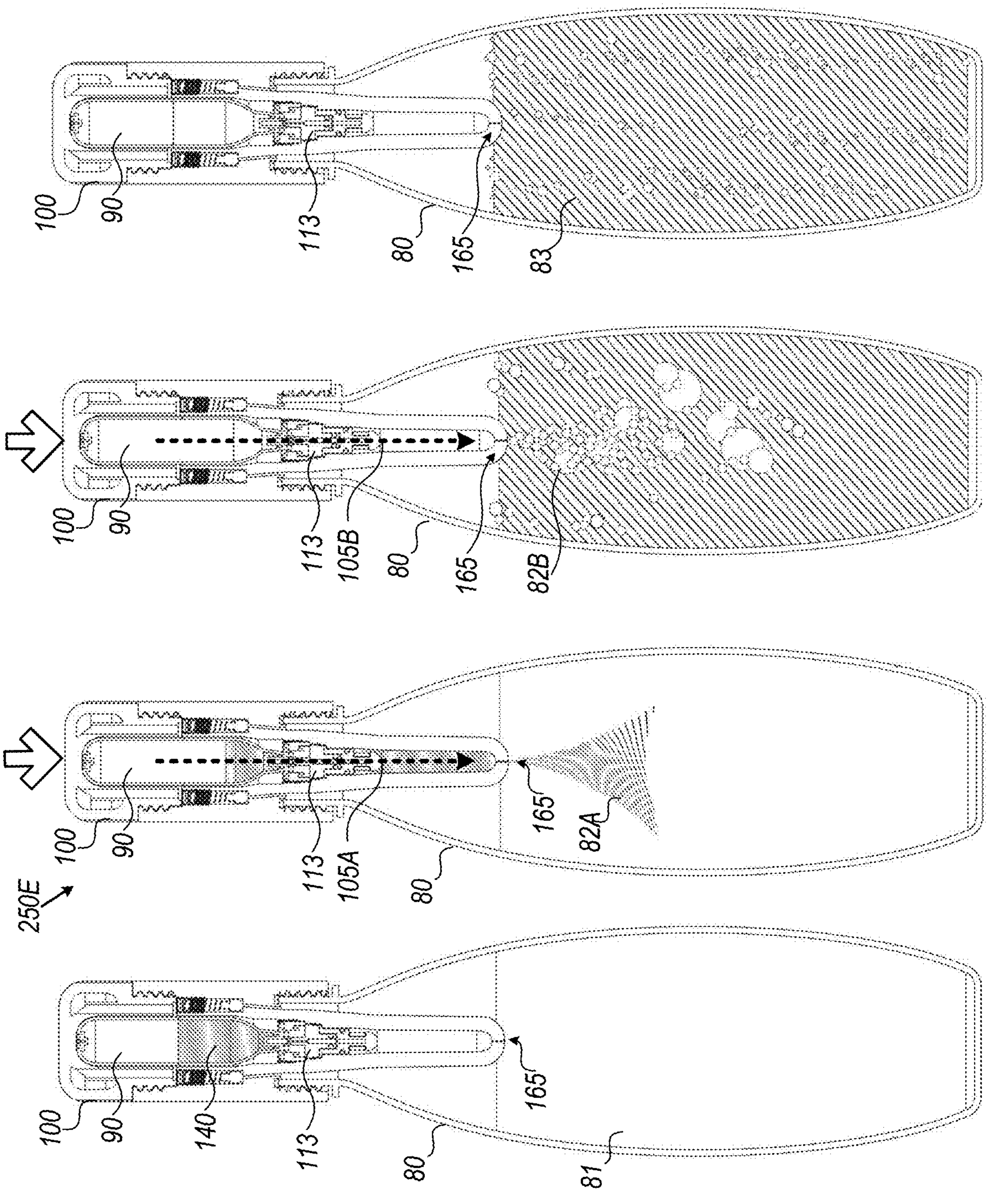

FIGS. 11A and 11B are high-level schematic illustrations of on-the-go carbonation device 100 and use stages 250 thereof, according to some embodiments of the invention. Sealed enclosure 110 may be formed by top cap 170 and bottle connector 190 that are sealably and moveably attached to each other to form housing 200 that holds gas canister 90, and actuator 115 may be operable by pressing top cap 170 against bottle connector 190, to puncture the seal of gas canister 90, e.g., by pushing gas canister 90 against hollow pin 112.

For example, top cap 170 and bottle connector 190 may be attached by at least one intermediate connector 180 that is configured as a spring-loaded connection that maintains the seal of sealed enclosure 110 while allowing the relative motion of top cap 170 with respect to bottle connector 190 that initiates the actuation. It is noted that intermediate connector 180 may be configured as a spring-loaded connection in other embodiments illustrated herein. Lower and upper supports 132 may be configured to hold gas canister 90 within sealed enclosure 110 formed by top cap 170 and bottle connector 190 of housing 200.

As disclosed herein, device 100 may further comprise adapter 150 that supports gas canister 90 and is sealably attached to bottle 80 by bottle connector 190. Conduit 160 may be part and continuation of adapter 150, and include valve 113 that regulates the flow of additives 140 and released gas towards the nozzle 165.

Gas canister 90 may be configured to hold at least one additive 140 (indicated schematically) in addition to the pressurized gas or fluid. In some embodiments, gas canister 90 may be configured to embody sealed additives container 142 as disclosed herein. For example, additive(s) 140 may be filled into gas canister 90 before filling the compressed gas, and move to the bottom part of gas canister 90 after sealing and placing thereof within sealed enclosure 110. Additive(s) 140 may be delivered into the liquid in bottle 80 by the delivered released gas, along gas release path 105. Kit(s) 450 may correspondingly include gas canisters 90 that further hold additive(s) 140, as disclosed herein.

FIG. 11B illustrates schematically the process of carbonating and enriching liquid 81, using gas canister 90 that includes additive(s) 140, according to some embodiments of the invention. Liquid 81 such as water may be filled into bottle 80 up to a demarcated filling line, and then device 100 may be at least partly screwed onto bottle 80, e.g., bottle connector 190 may be screwed thereupon. Gas canister 90 (that includes additive(s) 140) may be placed on top of adapter 150 and top cap 170 may be screwed onto intermediate connector 180 to form and seal enclosure 110 supporting and affixing gas canister 90. Upon actuation 115, top cap 170 may be further screwed or pressed (indicated schematically by the arrow) to move gas canister 90, to be punctured by hollow pin 112—indicated by stage 250E. Additive(s) 140, being heavier than the compressed gas in gas canister 90, are forced through nozzle 113 into the water—indicated by numeral 82A, with the flow path of additives 140 denoted by arrow 105A in FIG. 11B. Immediately following the release of additive(s) 140, released gas is introduced into the liquid and carbonates it—indicated by numeral 82B, with the flow path of the released gas denoted by arrow 105B in FIG. 11B. Clearly the delivery of gas follows immediately the delivery of additives 140, possibly with some intermixing thereof, and the schematic illustration herein is provided merely for explanatory purposes. Drinking enriched carbonated liquid 83 may be carried out through device 100 and/or after removal of device 100 off bottle 80.

Figure 12:
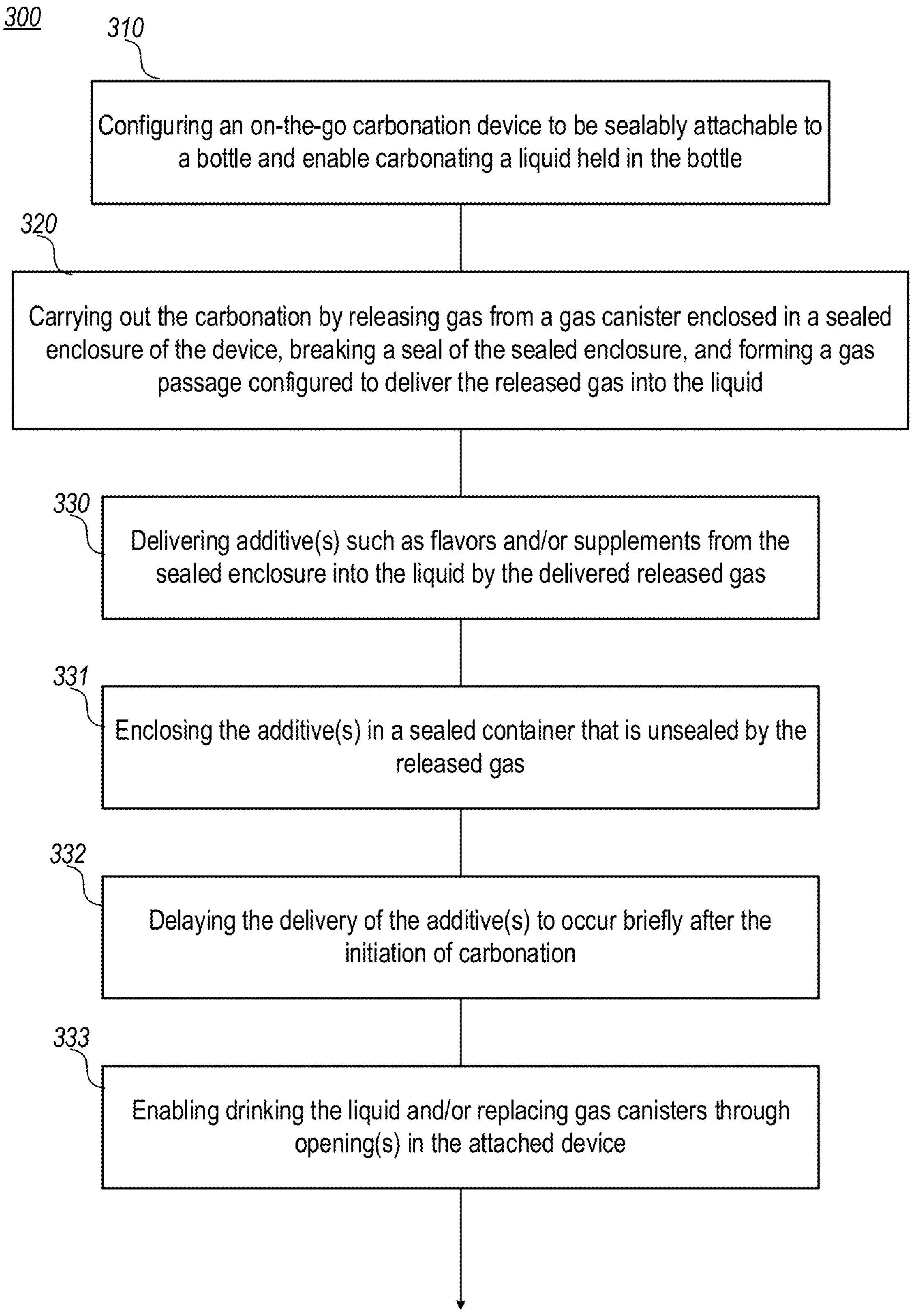
FIG. 12 is a high-level flowchart illustrating a method of providing on-the-go carbonation, according to some embodiments of the invention.
Figure 12:
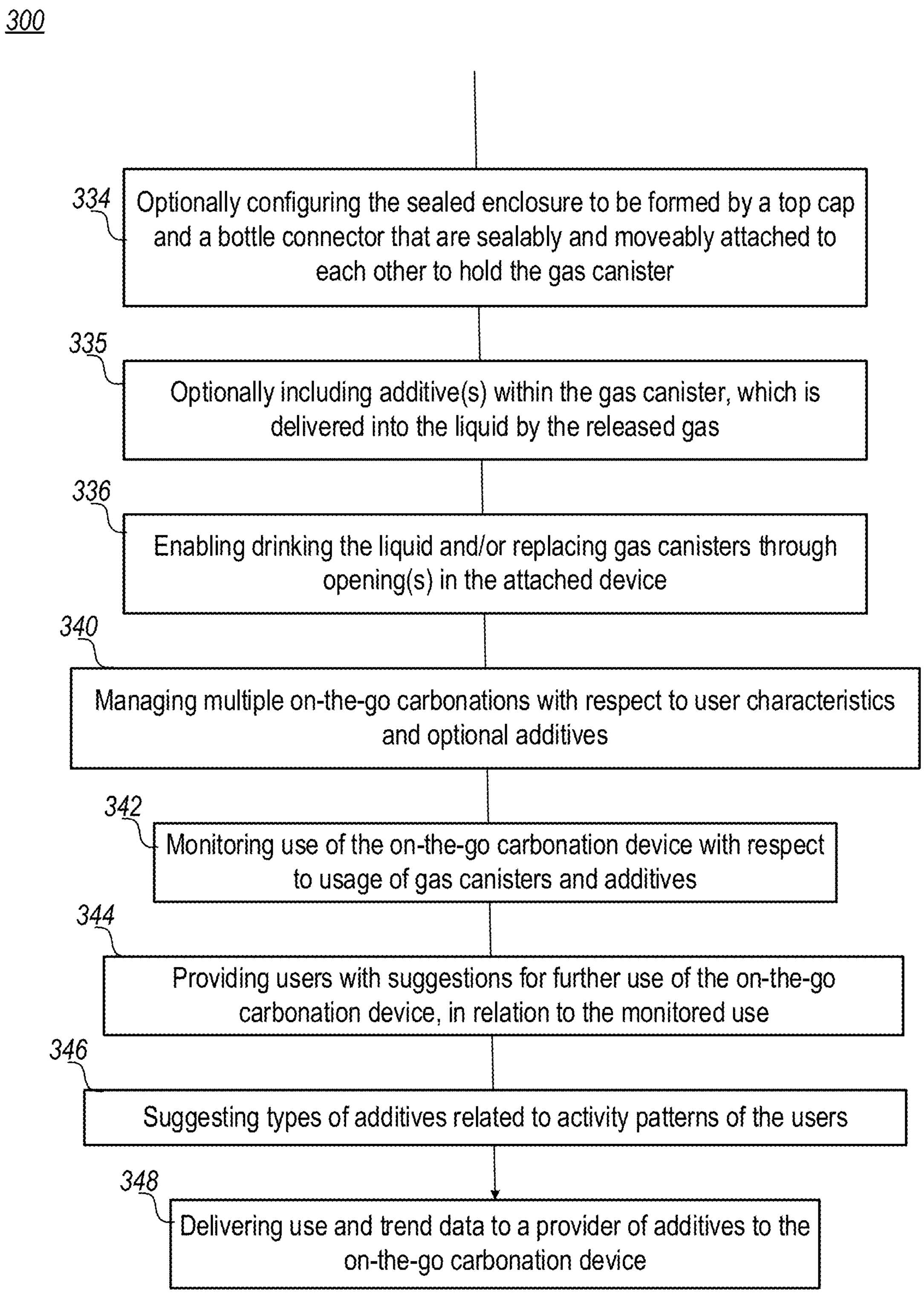

FIG. 12 is a high-level flowchart illustrating a method 300 of providing on-the-go carbonation, according to some embodiments of the invention. The method stages may be carried out with respect to on-the-go carbonation device 100 described herein, which may optionally be configured to implement method 300. Method 300 may be at least partially implemented by at least one computer processor, e.g., in controller(s) 60. Certain embodiments comprise computer program products comprising a computer readable storage medium having computer readable program embodied therewith and configured to carry out the relevant stages of method 300. Method 300 may comprise the following stages, irrespective of their order.

Method 300 comprises configuring an on-the-go carbonation device to be sealably attachable to a bottle and enable carbonating a liquid held in the bottle (stage 310), and carrying out the carbonation by releasing gas from a gas canister enclosed in a sealed enclosure of the device, breaking a seal of the sealed enclosure, and forming a gas passage configured to deliver the released gas into the liquid (stage 320). In some embodiments, the on-the-go carbonation device may be configured to be sealably attachable to various types of liquid containers.

In some embodiments, breaking the seal of the sealed enclosure may be carried out by actuation due to a relative movement of two parts of the sealed enclosure which are sealably and moveably attached to each other. In some embodiments, the gas passage is formed by bursting a predetermined breaking point in the sealed enclosure.

Method 300 may further comprise delivering at least one additive from the sealed enclosure into the liquid by the delivered released gas (stage 330). In various embodiments, method 300 may comprise enclosing the additive(s) in a sealed container within the sealed enclosure, with the delivering of the additive(s) carried out by unsealing, e.g., bursting at least one seal of the container by the released gas (stage 331). In some embodiments, method 300 may comprise configuring a gas communication path from the gas canister to the liquid in the bottle to cause the bursting of the container seal(s). In some embodiments, method 300 may comprise delaying the delivery of the additive(s) to occur briefly after the initiation of carbonation by the released gas (stage 332), for example method 300 may comprise configuring a fluid communication path from the container to the liquid in the bottle—to split off the gas communication path and create the delay between the initiation of the carbonation of the liquid by the released gas and the mixing of the additive(s) into the liquid.

In some embodiments, method 300 may comprise enabling the drinking of the liquid (e.g., after carbonation and mixing in of the additives) and/or replacing the gas canister through sealable opening(s) in the attached device (stage 333), e.g., by configuring at least one sealable opening through the on-the-go carbonation device to enable drinking the liquid therethrough, and/or configuring the on-the-go carbonation device to enable replacing the gas canister through at least one sealable opening—without removing the device off the bottle.

In some embodiments, method 300 may comprise configuring the sealed enclosure to be formed by a top cap and a bottle connector that are sealably and moveably attached to each other to hold the gas canister (stage 334), and optionally including at least one additive within the gas canister, which is delivered into the liquid by the released gas (stage 335). The actuation may be configured to cause releasing additive(s) into the liquid by the pressure of the gas, followed by releasing the compressed gas to carbonate the liquid.

In some embodiments, method 300 may further comprise managing multiple on-the-go carbonations with respect to user characteristics and optional additives (stage 340). For example, method 300 may comprise monitoring use of the on-the-go carbonation device with respect to usage of gas canisters and additives (stage 342), and providing users with suggestions for further use of the on-the-go carbonation device, in relation to the monitored use (stage 344) and/or suggesting types of additives related to activity patterns of the users (stage 346). In some embodiments, method 300 may further comprise delivering use and trend data to providers of additives to the on-the-go carbonation device (stage 348).

Figure 13A:
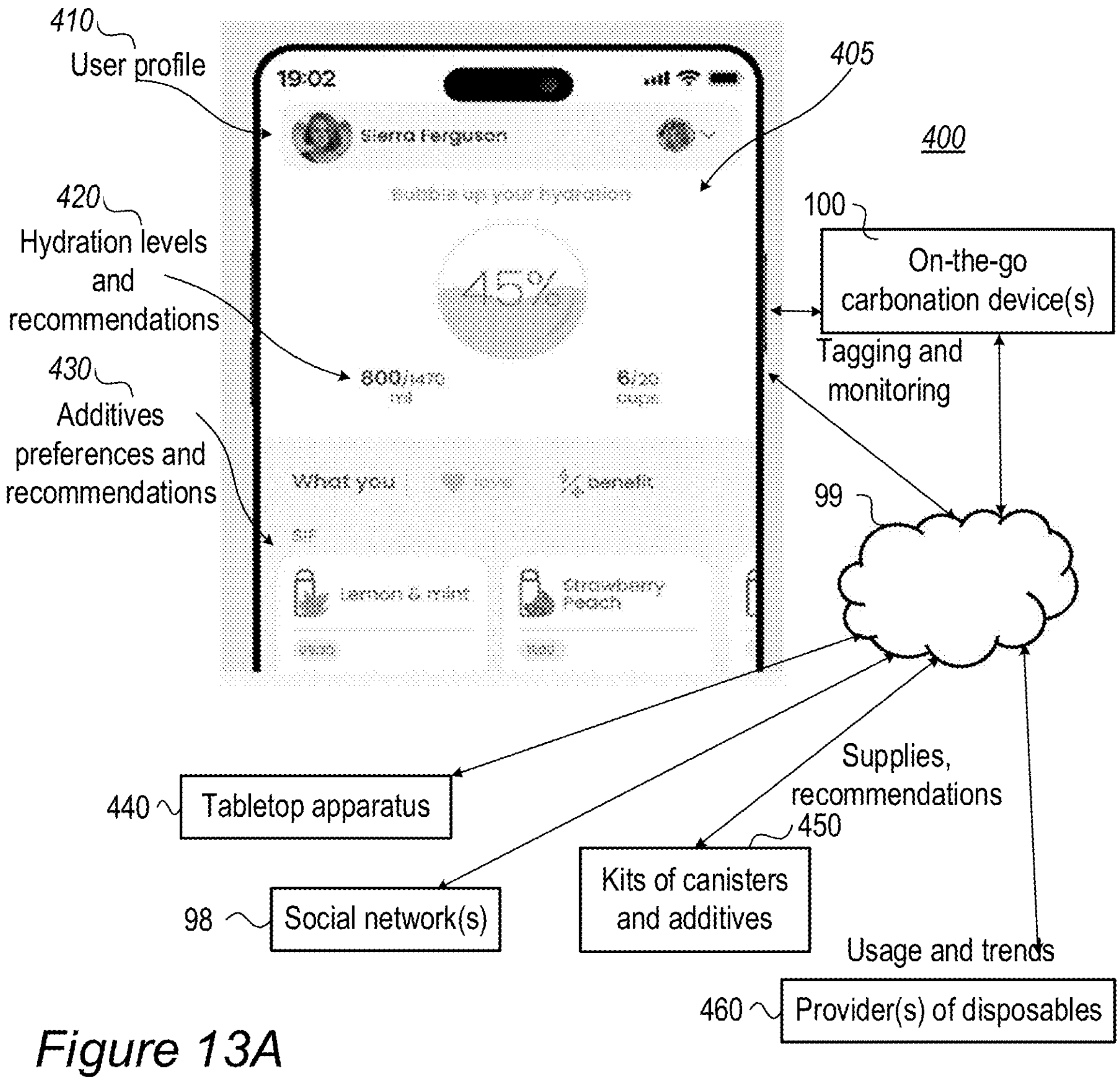
FIG. 13A is a non-limiting example of an application associated with the on-the-go carbonation device, according to some embodiments of the invention.

FIG. 13A is a non-limiting example of an application 405 associated with on-the-go carbonation device 100, according to some embodiments of the invention. In various embodiments, on-the-go carbonation device 100 may comprise sensors and/or tags (not shown), and replaceable (e.g., disposable or refillable) parts such as gas canisters 90 and additives containers 140 may likewise comprise sensors and/or tags that communicate with the application (e.g., directly, via wired or wireless communication, or indirectly via communication slinks, cloud servers, and the like, collectively denoted by numeral 99)—and provide information about the operation of on-the-go carbonation device 100 and use of gas canisters 90 and additives containers 140. Application 405 may be configured to display the usage data, suggest specific additives 140 in relation to other user information (e.g., daily schedule, training programs, collectively denoted user profile 410, physiological measurements such as level of hydration, or results of physiological tests, collectively denoted by numeral 420) and provide feedback concerning the use of on-the-go carbonation device 100 with respect to the user's state. Possibly, the application may be associated with social network applications 98, sharing the consumption data in relation to other users according to predefined rules and conditions. The application may also be configured to monitor trends (e.g., in the types of used additives 140) and provide feedback to the producer 460 to anticipate or create demand for specific additives 140, possibly in relation to different types of users, different geographical regions, times of the days, etc., which enable customization of the production and supply with respect to these and other parameters.

In various embodiments, the application may be used to track a user's use of on-the-go carbonation device 100 by registration of users and/or on-the-go carbonation devices 100 in a database, e.g., using barcodes, QR (quick-response) codes, RFID (radio frequency identification) tags, or any other marking and/or tracking elements. The application may be installed on a user's smartphone to provide preparation instructions such as required amount of water to be used with specific bottles and specific embodiments of on-the-go carbonation devices 100. In some embodiments, on-the-go carbonation device 100 may be associated with a tabletop apparatus 440 (illustrated schematically) configured to provide automatic refilling of sealed container 110, e.g., in association with user preferences and/or data from the application. The tabletop apparatus may also be configured to handle cold or hot liquids, and enable adding additives 140 (e.g., flavors and/or supplements) and/or carbonation to the respective liquids, by attaching on-the-go carbonation devices 100 to the respective container (of various types) of the liquids. Recommendations by the application are schematically and collectively denoted by numeral 430. Recommendations may be provided with respect to kit(s) 450 comprising gas canisters 90 and additive(s) container(s) 140 for refilling and/or replacing additive holding chambers 140 (of one or several types)—and with respect to user data and preferences.

Figure 13B:
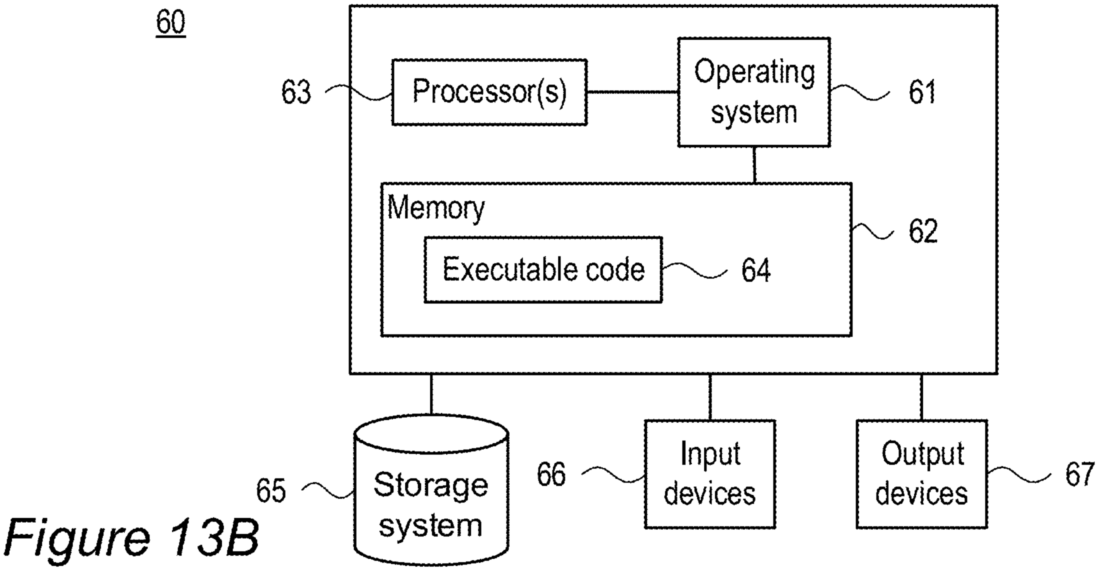
FIG. 13B is a high-level block diagram of exemplary controllers, which may be used with embodiments of the present invention.

Non-limiting embodiments comprise a computer program product comprising a non-transitory computer readable storage medium having computer readable program embodied therewith, the computer readable program comprising computer readable program configured to monitor use of an on-the-go carbonation device with respect to usage of gas canisters and additives, and computer readable program configured to provide users with suggestions for further use of the on-the-go carbonation device, in relation to the monitored use. In some embodiments, the computer readable program further comprises computer readable program configured to suggest types of additives related to an activity pattern of the user. In some embodiments, the computer readable program further comprises computer readable program configured to deliver use and trend data to a provider of additives to the on-the-go carbonation device. The application may be implemented using disclosed computer readable programs FIG. 13B is a high-level block diagram of exemplary controllers 60, which may be used with embodiments of the present invention. Controller(s) 60 may include one or more controller or processor 63 that may be or include, for example, one or more central processing unit processor(s) (CPU), one or more Graphics Processing Unit(s) (GPU or general-purpose GPU—GPGPU), a field-programmable gate array (FPGA), an application-specific integrated circuit (ASIC), a digital signal processor (DSP), a microprocessor, a chip, a microchip, an integrated circuit (IC), or any other suitable multi-purpose or specific processor, controller or computational device, an operating system 61, a memory 62, a storage 65, input devices 66 and output devices 67.

Operating system 61 may be or may include any code segment designed and/or configured to perform tasks involving coordination, scheduling, arbitration, supervising, controlling, or otherwise managing operation of controller(s) 60, for example, scheduling execution of programs. Memory 62 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory 62 may be or may include a plurality of possibly different memory units. Memory 62 may store for example, instructions to carry out a method (e.g., code 64), and/or data such as user responses, interruptions, etc.

Executable code 64 may be any executable code, e.g., an application, a program, a process, task or script. Executable code 64 may be executed by controller 63 possibly under control of operating system 61. For example, executable code 64 may when executed cause the production or compilation of computer code, or application execution such as VR execution or inference, according to embodiments of the present invention. Executable code 64 may be code produced by methods described herein. For the various modules and functions described herein, one or more computing devices and/or components of controller(s) 60 may be used. Devices that include components similar or different to those included in controller(s) 60 may be used and may be connected to a network and used as a system. One or more processor(s) 63 may be configured to carry out embodiments of the present invention by for example executing software or code.

Storage 65 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, VR model data, parameters, etc. may be stored in a storage 65 and may be loaded from storage 65 into a memory 62 where it may be processed by controller 63. In some embodiments, some of the components shown in FIG. 13B may be omitted.

Input devices 66 may be or may include for example a mouse, a keyboard, a touch screen or pad or any suitable input device. It will be recognized that any suitable number of input devices may be operatively connected to controller(s) 60 as shown by block 66. Output devices 67 may include one or more displays, speakers and/or any other suitable output devices. It will be recognized that any suitable number of output devices may be operatively connected to controller(s) 60 as shown by block 67. Any applicable input/output (I/O) devices may be connected to controller(s) 60, for example, a wired or wireless network interface card (NIC), a modem, printer or facsimile machine, a universal serial bus (USB) device or external hard drive may be included in input devices 66 and/or output devices 67.

Embodiments of the invention may include one or more article(s) (e.g., memory 62 or storage 65) such as a computer or processor non-transitory readable medium, or a computer or processor non-transitory storage medium, such as for example a memory as disclosed herein, a disk drive, or a USB flash memory, encoding, including or storing instructions, e.g., computer-executable instructions, which, when executed by a processor or controller, carry out methods disclosed herein.

Elements from FIGS. 1A-13B may be combined in any operable combination, and the illustration of certain elements in certain figures and not in others merely serves an explanatory purpose and is non-limiting.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. An on-the-go carbonation device that is sealably attachable to a bottle and enables carbonating a liquid held in the bottle, the device comprising:

a sealed container holding a gas canister, an actuator configured to release gas from the gas canister and break a seal of the sealed container, and a gas passage configured to deliver the released gas into the liquid.

2. The device of claim 1, wherein the sealed container comprises a top cover sealably and moveably attached to a bottom cover.

3. The device of claim 2, wherein the actuator is connected to the top cover, and the bottom cover comprises a predetermined breaking point, configured to burst upon the releasing of the gas and open the gas passage into the liquid.

4. The device of claim 1, further comprising a housing configured to hold the sealed container and sealably attach the device to the bottle.

5. The device of claim 1, further comprising a conduit that accommodates the gas passage from the sealed container to the liquid in the bottle, and a carbonation element at an end of the conduit that contacts the liquid in the bottle.

6. The device of claim 1, wherein the sealed container further holds at least one additive that is delivered into the liquid by the delivered released gas, wherein the at least one additive comprises at least one of: a flavoring agent, a coloring agent and a nutritional supplement.

7. The device of claim 6, wherein the sealed container comprises at least one pre-defined breaking point configured to burst and release the at least one additive upon the release of the gas from the gas canister, and wherein the device comprises a fluid communication path enabling the at least one additive to be delivered by the gas released from the gas canister into the liquid.

8. The device of claim 7, further comprising a gas communication path from the gas canister to the liquid in the bottle configured to cause the bursting of the at least one seal, and a fluid communication path from the container to the liquid in the bottle that splits off the gas communication path—configured to create a delay between an initiation of the carbonation of the liquid by the released gas and mixing of the at least one additive into the liquid.

9. The device of claim 1, wherein the sealed container is formed by a top cap and a bottle connector that are sealably and moveably attached to each other to form a housing that holds the gas canister, and the actuator is operable by pressing the top cap against the bottle connector, and wherein the gas canister further holds at least one additive that is delivered into the liquid by the delivered released gas.

10. A kit comprising a plurality of gas canisters and optionally additive containers for refilling and reusing the on-the-go carbonation device of claim 1.

11. A method of providing on-the-go carbonation, the method comprising:

configuring an on-the-go carbonation device to be sealably attachable to a bottle and enable carbonating a liquid held in the bottle, and carrying out the carbonation by releasing gas from a gas canister enclosed in a sealed container of the device, breaking a seal of the sealed container, and forming a gas passage configured to deliver the released gas into the liquid.

12. The method of claim 11, wherein breaking the seal of the sealed container is carried out by actuation due to a relative movement of two parts of the sealed container which are sealably and moveably attached to each other.

13. The method of claim 11, wherein the gas passage is further formed by bursting a predetermined breaking point in the sealed container.

14. The method of claim 11, wherein the on-the-go carbonation device is configured to be sealably attachable to various types of liquid containers.

15. The method of claim 11, further comprising enclosing the at least one additive within the sealed container and delivering the at least one additive from the sealed container into the liquid by bursting at least one seal of the container to release the gas from the canister, and releasing the at least one additive by the released gas—from the sealed container and into the liquid.

16. The method of claim 11, further comprising configuring the sealed container to be formed by a top cap and a bottle connector that are sealably and moveably attached to each other to hold the gas canister, and including at least one additive within the gas canister, which is delivered into the liquid by the released gas.

17. The method of claim 11, further comprising managing multiple on-the-go carbonations with respect to user characteristics and optional additives.

* * * * *